United States Patent
King et al.

(10) Patent No.: US 7,168,092 B2
(45) Date of Patent: *Jan. 23, 2007

(54) CONFIGURING PROCESSING UNITS

(75) Inventors: James E. King, Wokingham (GB); Martin P. Mayhead, Hindhead (GB)

(73) Assignee: Sun Microsystems, Inc., Santa Clara, CA (US)

( * ) Notice: Subject to any disclaimer, the term of this patent is extended or adjusted under 35 U.S.C. 154(b) by 883 days.

This patent is subject to a terminal disclaimer.

(21) Appl. No.: 10/086,147

(22) Filed: Feb. 28, 2002

(65) Prior Publication Data

US 2002/0087868 A1 Jul. 4, 2002

Related U.S. Application Data

(63) Continuation-in-part of application No. 09/930,384, filed on Aug. 15, 2001.

(30) Foreign Application Priority Data

Aug. 31, 2000 (GB) .................................. 0021456.9

(51) Int. Cl.
- G06F 7/04 (2006.01)
- G06F 15/173 (2006.01)
- G06F 15/177 (2006.01)
- G06K 19/073 (2006.01)
- H04L 9/32 (2006.01)
- G06F 7/00 (2006.01)
- G06F 15/16 (2006.01)

(52) U.S. Cl. .......................... 726/9; 235/375; 235/492; 709/220; 713/172

(58) Field of Classification Search ................ 235/375, 235/487, 492; 709/220–222; 712/38; 726/5, 726/9

See application file for complete search history.

(56) References Cited

U.S. PATENT DOCUMENTS 5,809,140 A * 9/1998 Rubin et al. ................. 380/279

(Continued)

FOREIGN PATENT DOCUMENTS

JP 07058749 A * 3/1995

(Continued)

OTHER PUBLICATIONS

U.S. Appl. No. 09/930,113, filed Aug. 15, 2001.

(Continued)

*Primary Examiner*—Gilberto Barron, Jr.
*Assistant Examiner*—Matthew Heneghan
(74) *Attorney, Agent, or Firm*—Meyertons Hood Kivlin Kowert & Goetzel, P.C.; B. Noël Kivlin

(57) ABSTRACT

A portable storage device, for example a secure smart card, contains network identification information and configuration information for a processing unit that is connectable to a data communications network, which processing unit includes a device reader for reading the portable storage device. The portable storage device includes storage and an access controller. The storage holds a network identity and configuration information for the processing unit and at least one encryption key. The access controller is operable to control access to the storage by implementing key-key encryption. An embodiment of the invention thus provides a medium not only for storing a network identity and configuration information for processing unit, but also for other secure information such as an encryption key associated therewith.

43 Claims, 14 Drawing Sheets

U.S. PATENT DOCUMENTS

| | | | | |
|---|---|---|---|---|
| 5,822,434 | A * | 10/1998 | Caronni et al. | 713/156 |
| 6,108,789 | A * | 8/2000 | Dancs et al. | 726/9 |
| 6,260,111 | B1 * | 7/2001 | Craig et al. | 711/115 |
| 6,345,299 | B1 | 2/2002 | Segal | 709/229 |
| 6,615,264 | B1 * | 9/2003 | Stoltz et al. | 709/227 |
| 6,654,797 | B1 * | 11/2003 | Kamper | 709/220 |
| 6,816,965 | B1 * | 11/2004 | Moore et al. | 713/158 |
| 6,948,090 | B1 | 9/2005 | King | |

OTHER PUBLICATIONS

U.S. Appl. No. 09/930,384, filed Aug. 15, 2001.

* cited by examiner

CONFIGURING PROCESSING UNITS

PRIORITY CLAIM

This application is a continuation-in-part of U.S. application Ser. No. 09/930,384 titled "Portable Network Encryption Keys", filed Aug. 15, 2001.

BACKGROUND OF THE INVENTION

The present invention relates to computer systems, and in particular to computer systems having processing units, which are connectable to a communications network via which information may be communicated.

There are many fields in which mankind has become reliant on computers to perform valuable and sometimes essential functions. The reliance on computer systems demands that the downtime of a computer system is as short as possible. The downtime of a computer system is a period during which a computer system is inoperable, for example as a result of a fault in the system. If a computer system goes down, the inconvenience and loss of revenue caused can be substantial. For example, if a computer system is operating as a server or exchange forming part of a telecommunications system, then during the down-time no communications can be performed using the telecommunications system, which can result in a considerable loss of business and therefore revenue for an organization. Computer systems are therefore arranged to be as reliable as possible, so that the downtime is reduced to a minimum. Accordingly, the up-time of a computer system may be required to be in the order of 99.9995%, which equates approximately to a down-time of a few seconds per year.

Computer systems are designed and manufactured to standards that reduce as far as possible the likelihood of malfunction. However, in order to minimize any down-time, which may occur as a result of a malfunction, it has been proposed to design parts of the computer system such that a part can be replaced as quickly as possible with a part which performs the same function.

In this context, a processing unit of a computer system can be arranged to be replaceable. The computer system can include one or more processing units interconnected via a network. The processing units are connectable to the network and can include one or more processors and a hard disk drive or other storage device containing software that controls the operation of the processing unit. Alternatively, or in addition, the processing unit can include a preprogrammed controller or microcontroller for providing processing functions. The processing unit typically also includes other components mounted on one or more carriers, for example on a motherboard. The processing unit often is housed in an enclosure, but may also be configured as a motherboard without a housing that plugs into a backplane.

Particularly in systems comprising multiple processors interconnected by a network for use in a telecommunications environment, the processors are configured as field replaceable units (FRUs) that are designed to be replaced in the event of a malfunction occurring in the processing unit. In such a situation, the hard disk of the replacement processing unit is often provided with pre-loaded software equivalent to the software processes loaded onto the original hard disk. The original processing unit may then be repaired off-line.

Such pre-loaded software, while equivalent to the software loaded onto the original hard disk, requires input of configuration information to cause the replacement FRU to be able to function as the original FRU. Such configuration information is traditionally stored on a mounted filesystem (i.e. the local hard disk) and therefore needs to be moved to the new FRU. Moving hardware such as disks from one FRU to another is time-consuming and risks damaging the hardware. Also, the disk of the failed FRU may be the component of that FRU responsible for the failure. Further, many FRUs are provided as "sealed" units configured not to allow components thereof to be extracted and replaced in the field. In order to move this configuration information without swapping the disk requires changes to be made to each application and user intervention in the event of failure.

The processing unit can also include communication interfaces to enable connection to a communications network. This can be used to effect communication between different parts of a computer system, which computer system includes the processing unit, and/or between different computer systems. The communications network concerned can, for example, be a local bus, a local area network, an intranet or the Internet or the like. In order to communicate via a network, the processing unit needs to be able to identify itself to the network. It is therefore provided with a network identity.

For example, communications networks, operable under an Ethernet protocol or the like, communicate data via a common medium to processing units attached to the medium by appending the data to network identities which the processing units recognize. Each processing unit which is arranged to communicate using a particular network standard such as Ethernet is therefore provided with a unique address, so that the processing unit may communicate via any network conforming to that standard. Typically, processing units forming part of a computer system are provided with a communications interface such an Ethernet interface, for embodying the network identity. Once the processing unit has been connected to the communications network, the network identity for that processing unit will be used by all other processing units connected to the communications network. This is typically arranged in that the processing units themselves receive, or a separate processing unit receives, the network identities from other processing units and pass(es) the network identities via a so-called device tree and they are then stored so as to provide configuration information to enable communication via the network.

Accordingly, processing units arranged to communicate via a communications network are each provided with a network identity, which is generally stored in memory of the processing unit. If a processing unit is replaced by another processing unit, the communications network and the devices connected to the communications network will not recognise that processing unit and so will be unable to communicate with the processing unit.

In order to effect replacement of a processing unit, the replacement processing unit should be arranged to communicate via the communications network, in substantially the same way as the original processing unit communicated and be configured to operate in substantially the same way as the original processing unit operated. In order to minimize downtime, it is desirable that the replacement be made as quickly and efficiently as possible.

SUMMARY OF THE INVENTION

One aspect of the invention provides a portable storage device containing network identification information and system configuration information for a processing unit that is connectable to a data communications network and includes a device reader for reading the portable storage device. The portable storage device comprises storage and an access controller. The storage holds a network identity and system configuration information for the processing unit.

An embodiment of the invention thus provides a medium for storing a network identity and system configuration information for a processing unit. The configuration information can be in the form of, for example, configuration data for configuring software operating on the processing unit. Holding such configuration information on a storage medium that also holds a network identity means that in the event that a processing unit connected to a network needs to be replaced, the connection of the replacement unit to the network and the configuration of that replacement unit can be configured readily on the basis of information on the portable storage device.

Further secure information, for example an encryption key, can be held in a secure area of the portable storage device. For example, typical hardware and software encryption solutions require long-term keys that are associated with session creation. They are digitally signed by a certification authority and have a life of approximately 2 years. If a server containing the hardware or software encryption solution fails, the rapid transfer of these keys to a replacement server in a secure fashion is highly desirable to increase service availability.

The portable storage device can comprise at least one secure storage portion accessible only under the control of the access controller by key-key encryption. The encryption key can be used to control access to the secure storage portion(s).

The storage of the configuration information can be in a secure and/or a non-secure portion of the storage according to a particular application. The storage can be effected by employing a conventional file system under the control of an operating system operating in the processing unit. The stored configuration information can be dynamically modified during use to take account of changes in system configuration.

The storage in the portable storage device can be formed from random access memory, the secure storage comprising a part of the random access memory.

The access controller can be a programmed microcontroller or microprocessor on the portable storage device. In one example of the invention, the portable storage device is a smart card.

Another aspect of the invention provides a processing unit connectable to a data communications network. The processing unit has a device reader for a portable storage device as set out above. The processing unit is operable to access the storage of the portable storage device to access a stored network identity and configuration information on initialisation of the processing unit.

The processing unit can comprise a service processor, for example a microcontroller, that is programmed to control reading of the portable storage device. The processing unit can be a computer server, for example a rack mountable computer server.

A further aspect of the invention provides a control program for a processing unit as set out above that is connectable to a data communications network. The control program is operable to read a network identity from the portable storage device and configuration information from the portable storage device on initialisation.

The control program is also operable to store configuration information on the storage device in use.

Another aspect of the invention provides a computer server comprising a device reader for reading a portable storage device, a processor, memory and a microcontroller programmed by the control program, the microcontroller being operable as a service processor and being connected to read the content of storage in a portable storage device mounted in the device reader.

BRIEF DESCRIPTION OF THE DRAWINGS

Embodiments of the present invention will be described hereinafter, by way of example only, with reference to the accompanying drawings in which like reference signs relate to like elements and in which.

DESCRIPTION OF PARTICULAR EMBODIMENTS

Figure 1:
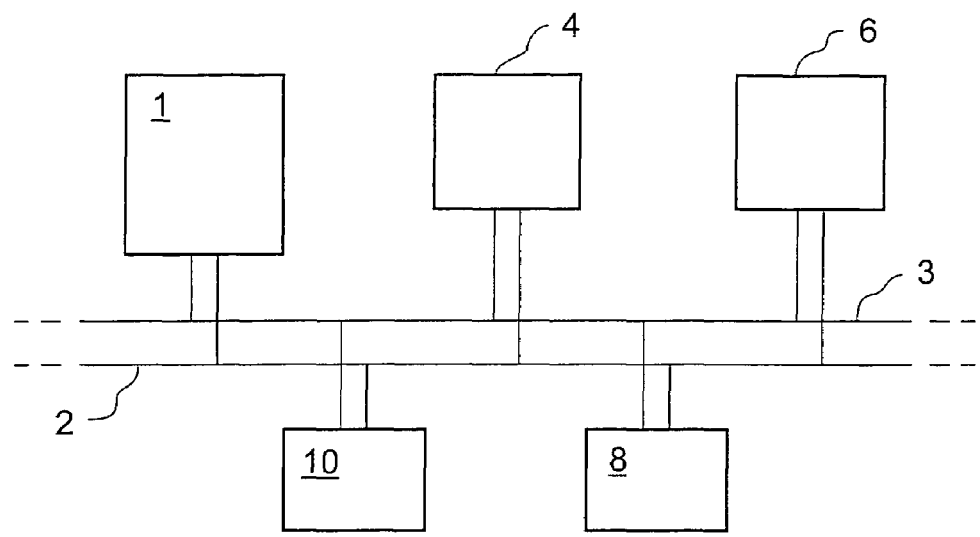
FIG. 1 is a schematic block diagram of a computer system.

A simplified block diagram of a computer network is shown in FIG. 1. In FIG. 1 data processing equipment 1 is shown connected to a data communications network 2. Also connected to the data communications network 2 are further examples of data processing equipment 4, 8 and 10, and other devices such as, for example, a printer 6. It will be appreciated that these are just examples of possible devices that can communicate via the data communications network. The data communications network may be a local area network (LAN), a wide area network (WAN), the Internet, etc.

Figure 2:
FIG. 2 is an illustrative representation of an Ethernet data packet.

The computer network shown in FIG. 1 is provided as an example only of an arrangement in which devices are designed to communicate data via a data communications network 2. The data communications network 2 can operate, for example, in accordance with an Ethernet protocol in which data is communicated via an Ethernet cable which provides a common medium through which all devices connected to the medium can receive and transmit data. Data to be communicated to a particular one of the devices connected to the network is detected and received by that device by an Ethernet address appended to the data. A conceptual diagram of the structure of an Ethernet packet is shown in FIG. 2 where a first field A represents the address of the device to receive the data and a second field D represents the data being communicated.

The computer system may also include a second communications network 3, which may be provided for reasons which will be explained shortly.

The present invention finds application in facilitating communication via a data communications network, particularly in a situation where a device coupled to the network is replaced by another, replacement, device. Any one of the devices shown in FIG. 1 could be configured in accordance with the invention. However in the following, as an illustration of the invention, embodiments of the invention will be described in the context of data processing equipment 1 as a device embodying the invention.

Figure 3:
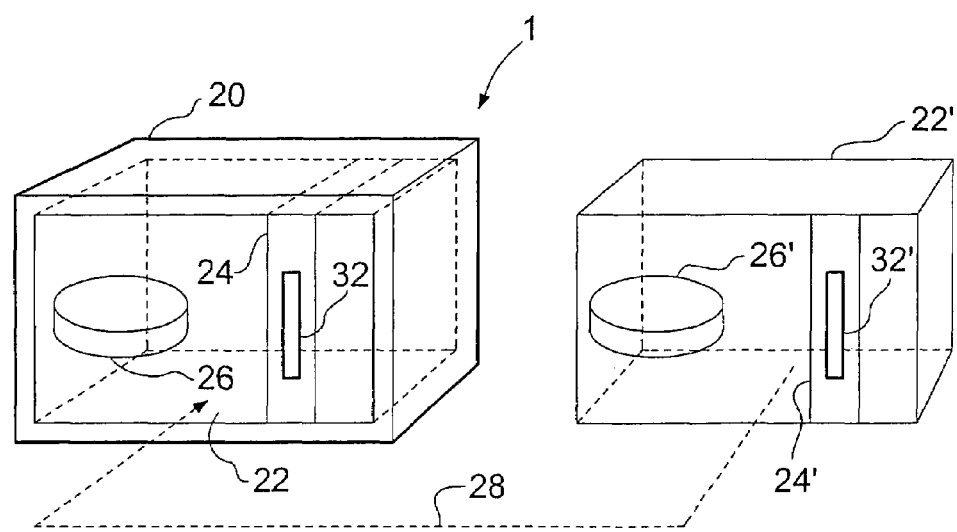
FIG. 3 is an aspect view of a schematic representation of a processing unit replaceably mountable within a chassis.

FIG. 3 is a schematic representation of an example of data processing equipment (data processor) 1 that includes a chassis 20 in which there is replaceably mounted a processing unit 22. The processing unit 22 is shown to include a motherboard 24, including a processor (CPU), a memory, etc, and a hard disk drive 26, although it will be appreciated that the processing unit 1 comprises other parts that are not shown in FIG. 3.

In order to communicate via the network, the processing unit 22 needs to have a network identity that can be recognised by other devices on the network. Also, the processing unit 22 will have associated with it certain parameters that define aspects of the system configuration including system configuration information, or configuration data, describing the state of the software installed on the hard disk relative to the initial state of that software.

Conventionally, devices to be connected to a communications network are provided with a unique network identity from the manufacturer that is fixed throughout the lifetime of the component. As a result the device may be connected to any data communications network conforming to the same standard for which the device has been configured to effect data communications.

An operating system running on the processing unit 22 can access the network identity, or network address, of each device in the computer network system via a device tree. The network identities of the devices are usually maintained for each of the devices by the operating system, unless and until the network is re-configured. The addresses of the devices connected to the network are established once by the operating system, using the device tree. Thereafter to effect communication via the network, the same network identity for a particular device is always used.

This is in itself all well and good. However, difficulties arise when a processing unit has to be replaced with another unit, for example as a result of a fault developing with the processing unit 22. In such a situation, and bearing in mind the requirements for high system availability, particularly in telecommunications applications, the most efficient way of restoring system availability minimising downtime is to replace the faulty unit. However, this brings with it the problem of allocating the network identity and the other configuration data to the replacement unit.

As represented in FIG. 3, therefore, in the event that the processing unit 22 is identified as being faulty, then the processing unit 22 is removed and is replaced by a corresponding processing unit 22' that performs an equivalent function. As such the hard disk 26' of the replacement processing unit 22' will typically have the same software as that loaded onto the hard disk of the original, and now faulty, processing unit 22. The arrow 28 represents the replacement unit 22' replacing the original processing unit 22 to perform the same function of the original processing unit 22 thereby minimising the downtime.

Simply replacing the processing unit 22 with a replacement unit 22' does not in itself allow the new processing unit 22' to operate. In particular, if one device on the network is simply replaced by another, communications via the data communications network cannot be made, because the replacement device will have a different network identity from that of the original device. Also, information will be required to configure the software on the hard disk 26' of the replacement processing unit 22' to correspond to the software on the hard disk 26 of the replaced processing unit 22 on initialising the replacement processing unit 22'. Similarly, it may be necessary to set hardware parameters and/or firmware parameters of the replacement processing unit 22' to those of the replaced processing unit 22 on initialising the replacement processing unit 22'.

An embodiment of the present invention contributes to enabling the replacement processing unit 22' reliably and securely to continue communicating using the data communications network 2 without requiring a reconfiguration of the network and enabling the replacement processing unit 22' to perform processing as the replaced processing unit 22 without requiring manual reconfiguration of its software and/or hardware and/or firmware components, or reprogramming by the loading of additional separate sets of media.

An arrangement is provided in which data communications via the network and equivalent processing can continue after a device has been replaced. This arrangement provides continued communications, without the devices comprising the computer system having to change the address to which data destined for that device is communicated, which would be required if the network were to be re-configured and provides data processing continuity without the software and/or hardware of the replacement unit having to be reconfigured manually or by means of separate sets of media.

FIG. 3 schematically represents that the motherboard 24 includes a device reader having a receiving gap 32 through which a portable storage device may be received and read by the device reader. A better understanding of the arrangement of the motherboard 24 is provided through an illustration of a first example of processing unit shown in FIG. 4 where parts also appearing in FIG. 3 bear the same numerical designation.

It should be noted that although in this example the device reader is described as being on a motherboard, this is merely for convenience of illustration. For example, a processing unit may not include a motherboard. Also, the device reader may be located anywhere in or attached to a processing unit as long as it is functionally interconnected with other elements of the processing unit to enable the reading and processing of data from a portable storage device.

Figure 4:
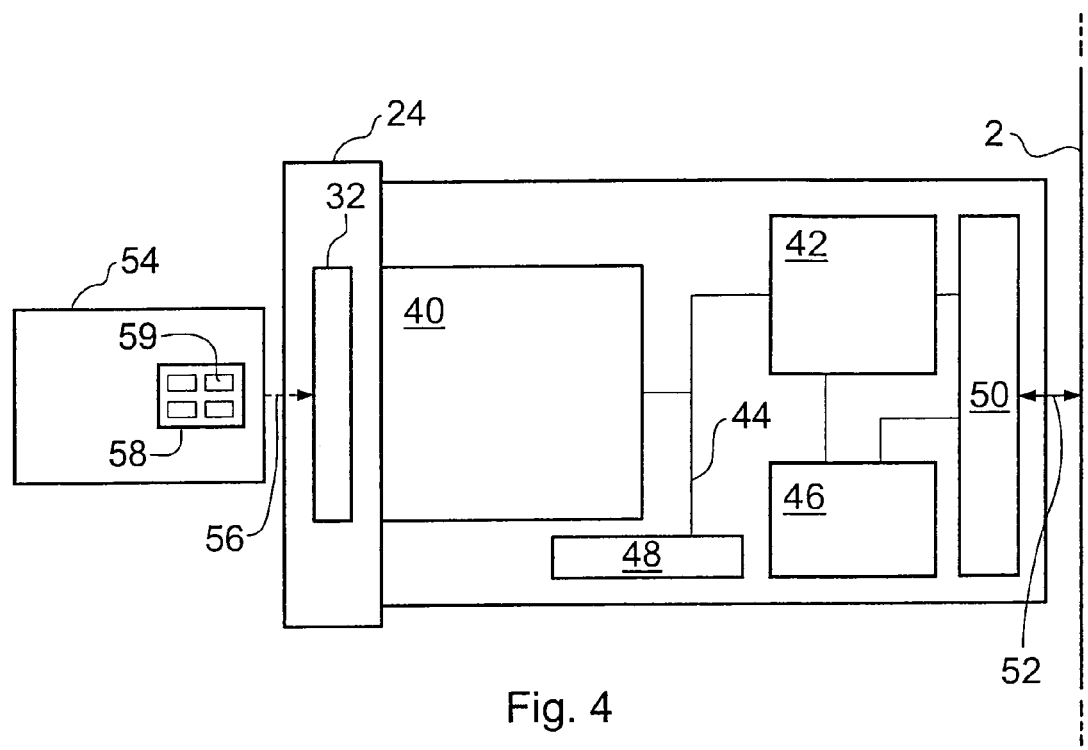
FIG. 4 is a part aspect view, part block diagram of a part of an example of a processing unit, shown in FIG. 3, embodying the present invention.

In FIG. 4, the motherboard 24 has a device reader 40 that is connected to a processor 42 on the motherboard via a local bus 44. The local bus 44 may be for example an I2C serial bus. The motherboard also includes a non-volatile random access memory 46 that is also connected to the processor 42. The motherboard 24 further includes a boot programmable read only memory (PROM) 48 which is connected via the I2C bus 44 to the processor 42 and to a communications port 50, which is connected via connector 52 to the data communications network 2. FIG. 4 also represents, by means of the arrow 56, the insertion of a portable storage device 54 into the device reader 40.

The portable storage device 54 in the example embodiment of the present invention is a smart card which includes a random access memory (RAM) 58 in which a network identity and other data to be used by the processing unit is pre-stored. The smart card also includes a microcontroller 59 that is to provide security of access to at least the network identity stored in the smart card.

However it will be appreciated that a smart card is merely an example of a portable storage device 54 that is hand holdable and hand insertable into and removable from the reader 40. Other portable storage devices could be used, advantageously other solid state storage devices such as a Subscriber Identity Module (SIM), or a MEMORY STICK ® module, or the like, that can be configured as a secure, highly portable storage medium.

The operation of the processing unit shown in FIG. 4 will now be explained. In order to provide a facility through which the replacement processing unit 22' may use the same network identity as the original processing unit 22, data representing the network identity is pre-stored in the smart card 54. In addition, configuration information describing the current operational conditions of the software being run by the original processing unit 22 is stored and regularly updated in storage of the smart card 54. Similarly, configuration information describing the current operational conditions of hardware components of the original processing unit 22 can be stored and regularly updated in storage of the smart card 54. As such, when the processing unit 22 is replaced, the smart card 54 may be removed from the smart card reader 40 on the motherboard 24 and introduced into the corresponding smart card reader 40' of the motherboard 24' in the replacement processing unit 22'.

Following power-up of the data processing equipment 1, the processor 42 on the motherboard 24 reads instructions from the boot PROM 48. In accordance with these instructions the processor 42 operates to interrogate the smart card reader 40 via the I2C bus 44 to ascertain whether or not a smart card is present in the smart card reader 40. If the smart card is present, the processor 42 operates to read the network identity from the smart card 54 and to configure the communications port 50 with this network identity. The address is then used to update a device tree, which provides a list of the network identities of the devices connected to the network, with this address in a conventional manner. Thereafter, data communications are effected via the data communications network 2 through the link 52 using the address supplied from the smart card 54.

The processor 42 also operates to read the configuration information from the smart card 54 and to configure software installed on a hard disk 26 associated with the motherboard 24 and/or hardware components of a processing unit 22 using this configuration information.

Accordingly, it will be appreciated that for the network 2 and the other devices 4, 6, 8 and 10 communications are unaffected, and apart from the period during which the original processing unit 22 is replaced by the processing unit 22', communications via the network are substantially uninterrupted. In the event, however, that the smart card 54 is not present in the reader 40, the processing unit could be arranged to terminate the boot operation and to signal a fault.

Figure 5:
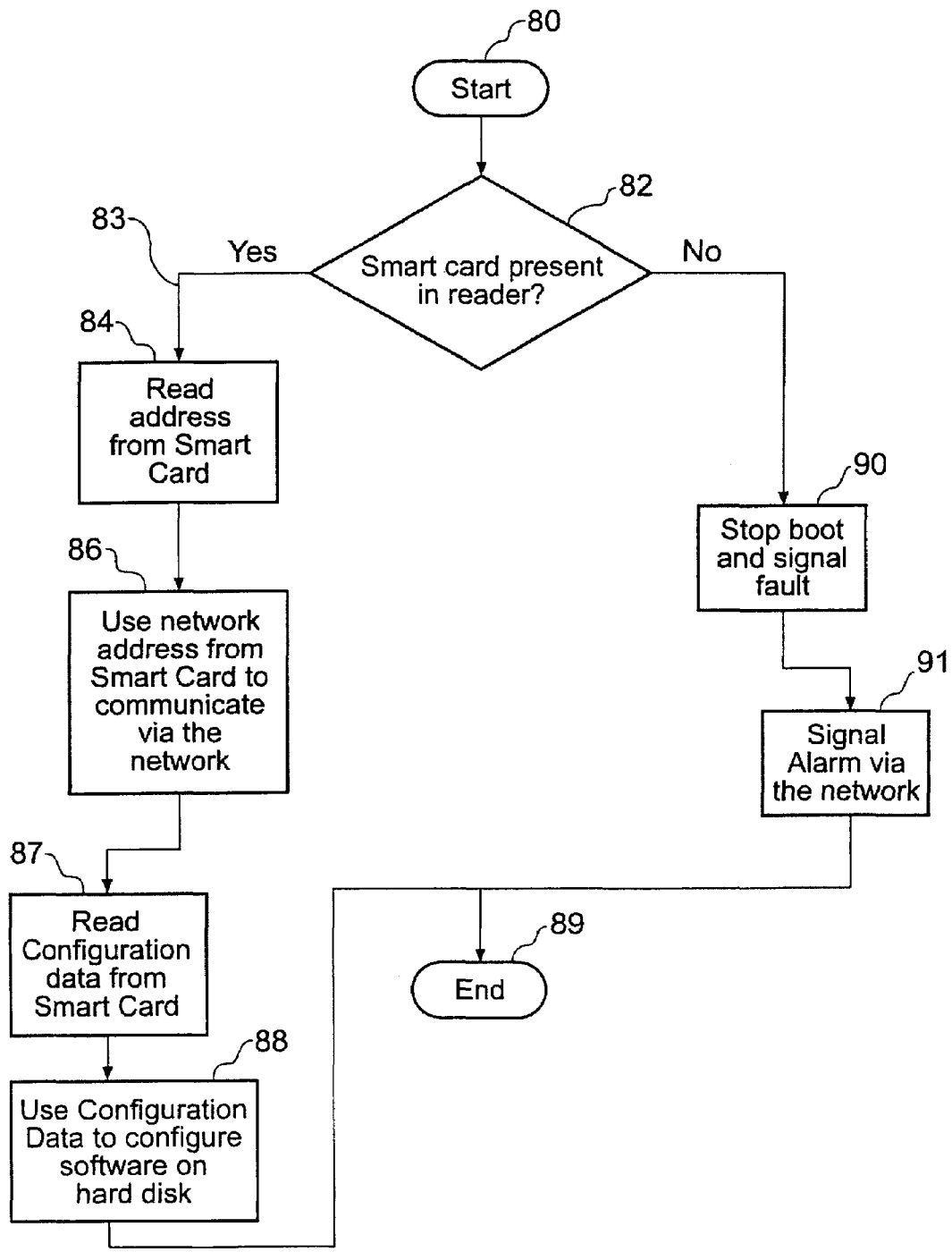
FIG. 5 is a flow diagram representative of the operation of the processing unit according to FIG. 4.

An example of the operation of the processor 42 on reading the code in the boot PROM 48 is summarised by the flow diagram shown in FIG. 5. In FIG. 5 at the start of the process 80 the processor reads the boot PROM 48 and performs the following steps.

At decision step 82 the processor determines whether there is a smart card present in the smart card reader 40. If the smart card is present then the processor operates at step 84 to read the network identity from the smart card. At process step 86 the processor configures the communications port 50 to use the network identity from the smart card to communicate via the network. Following this, the processor operates at step 87 to read the configuration data from the smart card. At processor step 88, the processor configures software stored on the hard disk using the configuration information. At this point the process terminates 89.

It should be noted that steps 84 to 88 do not need to be performed in the sequence shown. For example, steps 84 and 88 could be performed in parallel with, or after, steps 87 and 88.

If the smart card is not present in the smart card reader then the processing unit is operable to terminate the boot operations and to signal a fault in step 90.

As an alternative to terminating the boot operation in the absence of a smart card, if a set of unique network identities different from those used on the smart cards were made available by the hardware manufacturer, it would be possible, when the smart card was not present for the processor 42 to read such a default network identity from a non-volatile RAM 46 provided, for example, on the motherboard. The non-volatile RAM 46 can be arranged to store the default network identity, which would be pre-designated and pre-loaded into the non-volatile RAM 46 by the manufacturer of the motherboard 24 and would not be transportable between systems. In such a case, in the event that the smart card 54 is not present in the smart card reader 40, then the default network identity from the non-volatile RAM 46 could be used by the motherboard to communicate via the network 2. In this situation, the processing unit operating without a smart card is configured to raise an alarm via the network to indicate that it requires user servicing to either insert a smart card and reboot the processing unit or to manually configure the software of the processing unit due to the absence of the configuration information.

Figure 6:
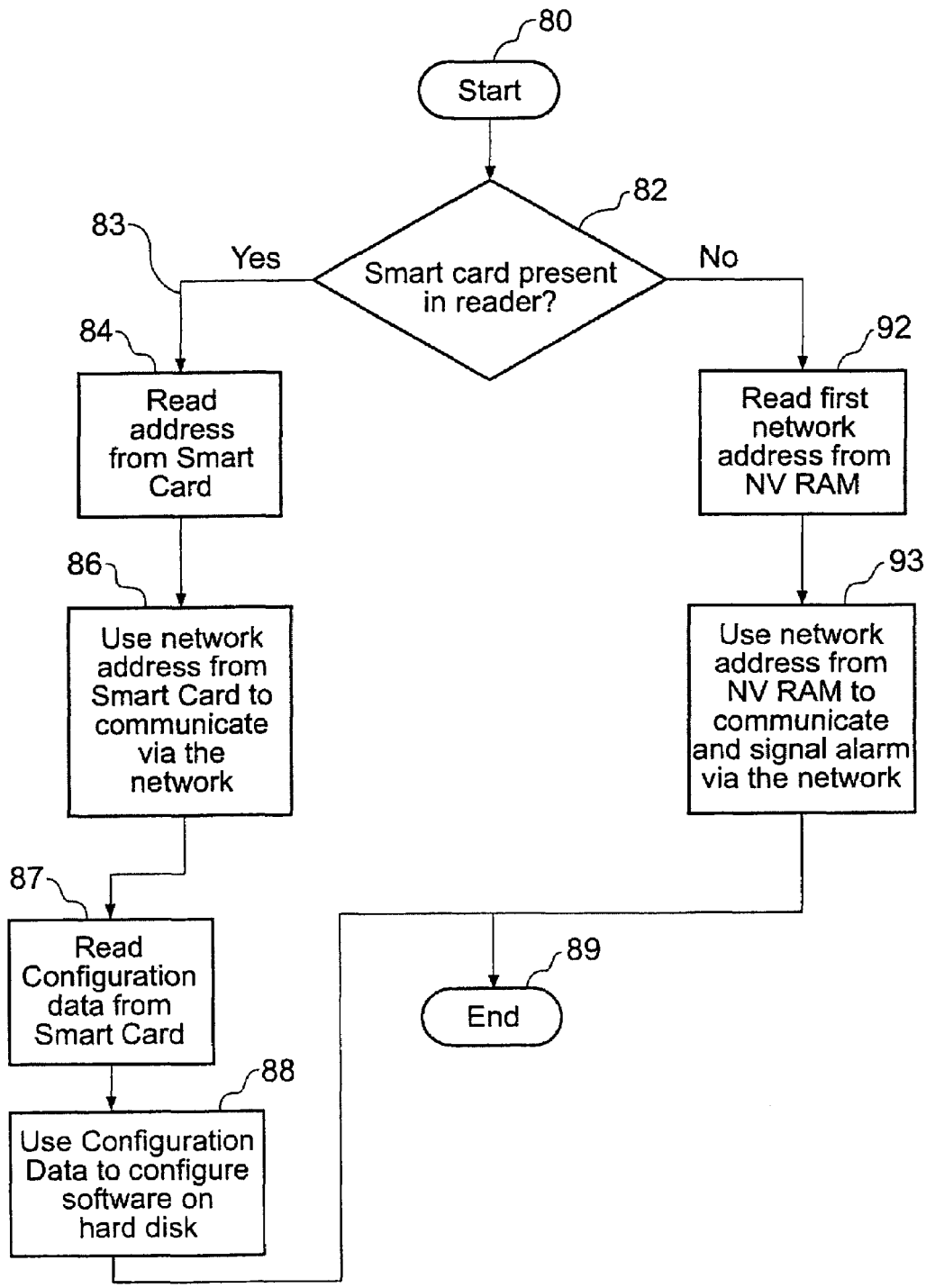
FIG. 6 is a flow diagram representative of an alternative operation of the processing unit according to FIG. 5.

An example of the operation of the processor 42 on reading the code in the boot PROM 48 for this alternative is summarised by the flow diagram shown in FIG. 6. In FIG. 6 at the start of the process 80 the processor reads the boot PROM 48 and performs the following steps.

At decision step 82 the processor determines whether there is a smart card present in the smart card reader 40. If the smart card is present then the processor operates at step 84 to read the network identity from the smart card. At process step 86 the processor configures the communications port 50 to use the network identity from the smart card to communicate via the network. Following this, the processor operates at step 87 to read the configuration information from the smart card. At processor step 88, the processor configures software stored on the hard disk using the configuration information. At this point the process terminates 89.

It should be noted that steps 84 to 88 do not need to be performed in the sequence shown. For example, steps 84 and 88 could be performed in parallel with, or after, steps 87 and 88.

If the smart card is not present in the smart card reader then the processor operates to read the first network identity from the non-volatile RAM (NV RAM) 46 at process step 91.

The processor then operates to use the first network identity from the NV RAM 46 to configure the communications port 50 to communicate 93 using the first network identity via the communications network. The processor then signals a lack of configuration information alarm via the network. The process then terminates 89.

Whichever alternative process is used, once the processor 42 has read the boot PROM 48 and configured the communications port 50 with the network identity, the processor probes all the devices and passes the results of the probe to the operating system via a device tree. As will be appreciated, the address of the processing unit comprising the motherboard is particularly important to the computer system because this represents the root level Media Access Control (MAC) address of the computer system.

Alternative examples of processing units may be provided with more than one communications port for connection to more than one data communications network. This is shown in FIG. 1 as the second communications network 3. The additional communication port(s) may be provided on the motherboard in order to increase redundancy so that if one communications network should fail then data communications may be made via the other communications network. This may also be required in order to increase the bandwidth which may be communicated to and from the motherboard. Another reason for providing two networks would be to allow for two separate networks to be established. One network may be used for system administration and one for network communications, which may include Internet access. The system administration may be performed by a management network. Therefore the communications port is arranged to provide multiple Ethernet ports through which data may be communicated in parallel. Accordingly, the smart card for this further embodiment will include a second network identity for use in communicating via the second network, and the NV RAM may include a second initial network identity.

One potential problem with the use of a smart card or other portable storage device carrying the network identity (e.g., the MAC address) for a processing unit can occur where the smart card is removed from a processing unit while it is running, and is then placed in another processing unit which is then started. As a result of this, it could occur that two processing units connected to the same network could have the same network identity (e.g., MAC address), whereby the network could be brought down. As described later in this document, it is possible to provide security devices to prevent unauthorised removal of the smart card, or the like. However, it can also occur that during maintenance or other authorised operations, two smart cards could be removed from two processing units, and then those smart cards could inadvertently be replaced in the wrong processing unit.

Figure 8:
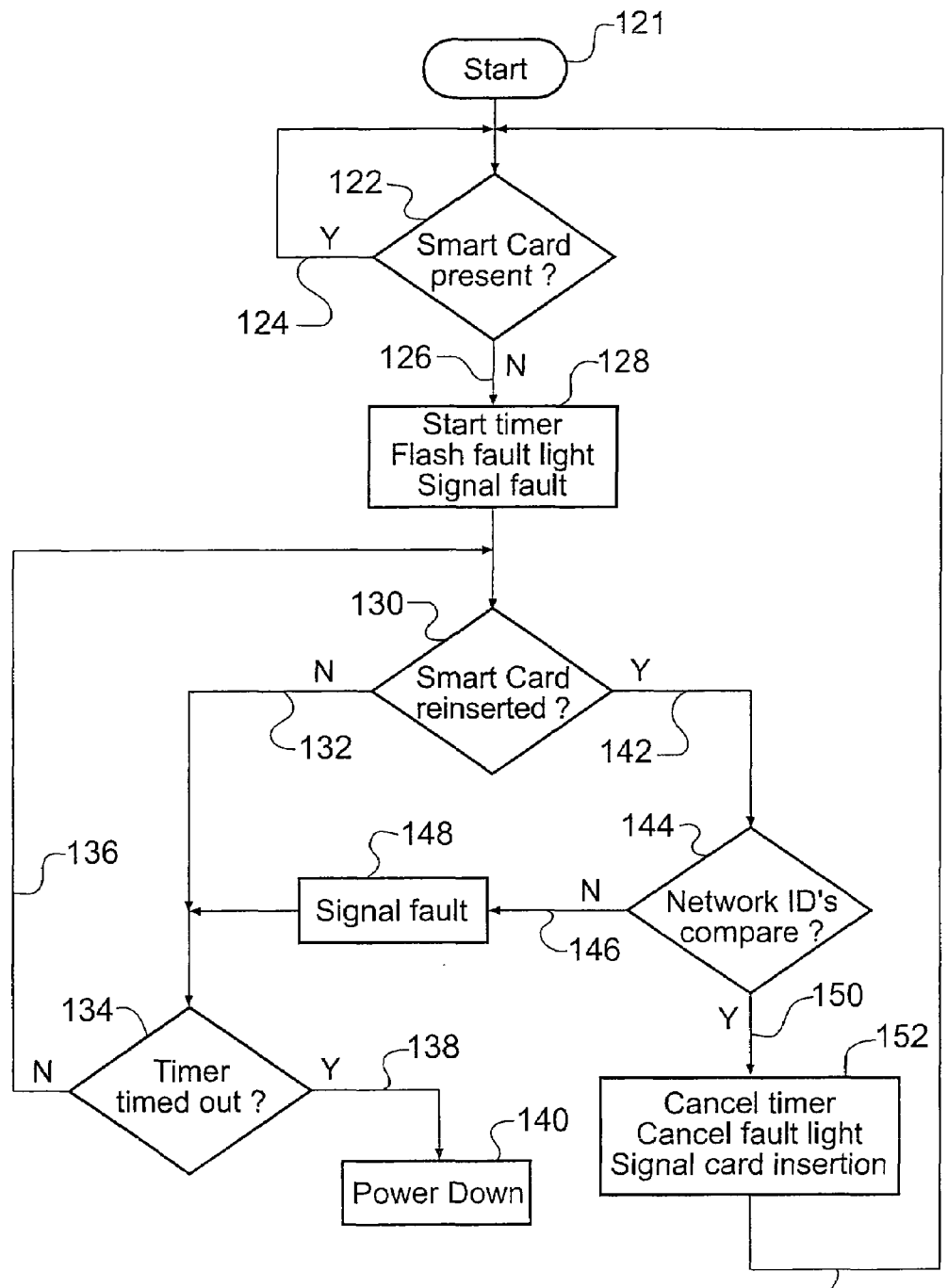
FIG. 8 is a flow diagram illustrating a process for monitoring the presence of a portable storage device in the processing unit.

FIG. 8 illustrates a process to address this potential problem.

The presence of the smart card 54 can readily be monitored by a simple hardware presence pin, that is a pin and associated signal line which carries a signal indicating that a card is present in the card reader. Such a pin forms a standard part of a typical card reader and the signal could be carried by a dedicated signal line or via presence signals over an I2C bus in a well understood manner.

The process indicated in FIG. 8 uses this presence indicator to monitor the presence of the smart card. A prerequisite for the method of FIG. 8 is the storage in the processing unit (possibly in main memory, but advantageously in persistent storage such as in an EEPROM or a disk drive) of the network identity read from the smart card in step 84 of the processes described with reference to FIGS. 5 and 6.

Figure 7:
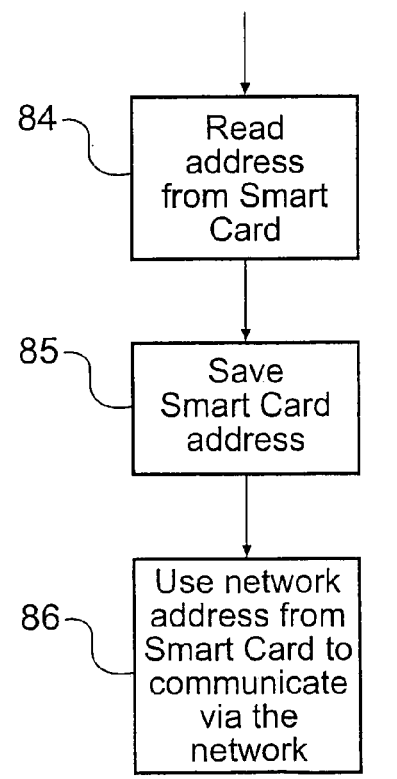
FIG. 7 illustrates a modification to the processes of FIG. 5 and FIG. 6.

FIG. 7 illustrates an additional step 85 that is performed between the steps 84 and 86 in the process of FIG. 5 or FIG. 6. In step 85, the network identity read from the smart card in step 84 is stored in, for example the NV RAM 46, or alternatively in random access memory, a storage device such as a disk drive, register, etc. This step 85 is performed, like the rest of the process of FIG. 5 or FIG. 6, when the processing unit is initially powered up. Accordingly, when a smart card containing the network identity is inserted into the processing unit prior to powering up the processing unit, step 85 ensures that the same network identity will be stored in a storage location in the processing unit as well as being used for network communications.

Turning now to FIG. 8, following the end step 88 of the process described in either FIG. 5 or FIG. 6, the process of FIG. 8 starts at step 121.

Decision step 122 represents the monitoring of the presence pin to indicate whether the smart card 54 is still present in the smart card reader 40. If the smart card 54 is present in the smart card reader 40, then decision path 124 is followed whereby, following a settable delay, decision step 122 is performed once more. In the event, however, that it is determined in decision step 122 that the smart card 54 is not present in the smart card reader 40, then decision path 126 is followed.

In step 128, a timer is started to time a period following detection of the absence of the smart card 54, at the end of which the processing unit will be powered down unless the smart card is reinserted. In step 128, the processing unit also causes a fault LED to flash and a fatal event signal to be generated.

At decision step 130, a test is made as to whether a smart card 54 has been reinserted into the card reader 40. If this is not the case, then decision path 132 is followed. If in step 134 the predetermined time as defined by the timer has elapsed, then decision path 138 is followed, and the system is powered down at step 140. If the time determined by the timer has not yet elapsed, then decision path 136 is followed, and a further test is made at step 130 as to whether a smart card 54 has been reinserted into the smart card reader 40. If it is determined in step 130 that a smart card 54 has been reinserted into the smart card reader 40, then decision path 142 is followed.

In decision step 144, a test is made as to whether the network identity from the newly inserted smart card 54 corresponds to the network identity stored in the processing unit from the card that was present when the processing unit was initially powered up. If the network identities are not the same, then decision path 146 is followed. As the configuration information is periodically updated from the processing unit to the smart card, a comparison between the configuration information on the card and the current state of the software of the processing apparatus is not a practicable check. The flashing of the fault LED and the timing of the timer continues, and in step 148 a further fatal event signal is generated, prior to testing once more, in decision step 134, whether the time indicated by the timer has elapsed.

Returning to decision step 144, if the network identity in the newly inserted card corresponds to the network identity stored in the processing unit from the card that was present when the processing unit was powered up, it is determined that the same smart card 54 has been reinserted into the card reader 40 and decision path 150 is followed. In step 152, the timer and the flashing of the LED is cancelled, and a card insertion event signal is sent. Control then passes via path 156 back to step 122.

The time indicated by the timer within which the correct smart card 54 has to be reinserted in order to avoid the processing unit 140 being powered down, is settable according to user requirements. The time could, for example, be 20 seconds, 30 seconds, 60 seconds, 180 seconds etc. The predetermined time is set to be less than the time it would take for a further processing unit that had received the card to power up. A predetermined time of 60 second would, for example, typically be appropriate. Accordingly, the predetermined time is chosen such that a network conflict resulting from two processing units on the network having the network identity, for example as a result of putting a removed card in another processing unit and then powering up the other processing unit, can be avoided.

The events referenced above are logged in persistent memory within the processing unit and can be exported to user interfaces such as a system console interface or a network management interface.

Figure 9:
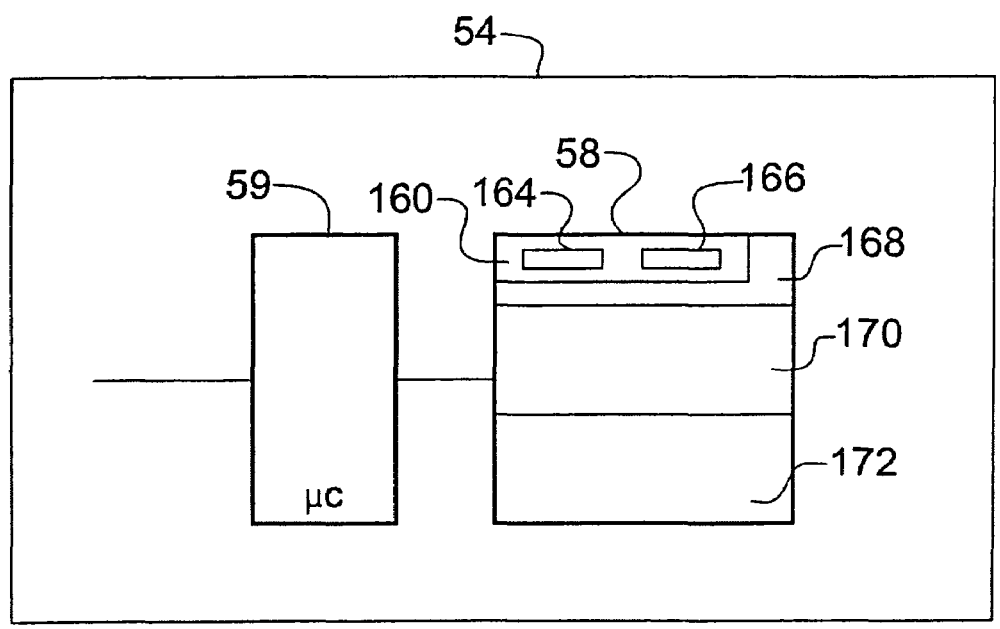
FIG. 9 is a schematic block diagram of elements of an example of a portable storage device.

FIG. 9 is a schematic representation of the circuitry contained within a smart card 54. The smart card 54 illustrated in FIG. 9 includes a microprocessor or microcontroller 59 that receives inputs and power via contacts provided on the smart card 54. The connections can support, for example, an I2C bus for the exchange of information via the card reader 40 to the processing unit.

The microcontroller or microprocessor 59 acts as an access controller for controlling access to the random access memory 58 which forms the smart card storage. The amount of storage provided in the smart card can vary according to the desired application. For example, for the present application, a storage capacity of the order of 8 Kbytes could be suitable, although other capacities could easily be used.

As will be described later, the storage 58 can be used to define one or more storage areas, including, for example, a first storage portion 168 (e.g., 2 Kbytes) that is used for a network identity (e.g., MAC address) and boot (e.g., DOS or OBP) information, with another other storage portion 170 allocated for storage of configuration information and other storage portions such as 172 being allocated for the storage of other information. Within the storage portion 168, a predetermined block 160 (e.g. of 20 bytes) can be set aside to provide a network identity storage location 164 and possibly one or more other storage locations 166 that can contain particular information, or be left unused.

The access controller 59 is operable to implement, among other things, the employed encryption technology (here key-key, otherwise known as key to key or paired key, encryption) whereby one or more of the portions of the storage may be designated as secure storage portions accessible only under the control of the access controller 59 and in response to the receipt of appropriate encryption keys from a requesting processing unit. In the present embodiment, the portion 160 is allocated to be a secure storage portion such that the network identity storage portion 164 is secure but the configuration information storage 170 is not secure. The configuration information storage could also be secure in other embodiments by altering the size and location of the secure portions of a given smart card by providing instructions to the microcontroller 59. Separate control can be provided, in a conventional manner, for the various storage portions, for read and/or write access. Smart Cards providing the functionality described above are commercial items that are readily available.

In order that a smart card 54 be operable by a processing unit as a storage medium for configuration information, the storage area of the smart card memory 54 intended for use as the configuration information storage area needs to be readable by the processing unit. This may be achieved by formatting the relevant area of smart card memory 58 using a conventional file system provided by the operating system employed by the processing unit 22. A file system is a mechanism for naming and placing files in a storage system in a logical manner for storage and retrieval, and forms a standard part of conventional operating systems a Solaris™ operating system, other UNIX™-based operating systems, MSDOS™, Microsoft Windows™ operating systems. The processing unit will include a driver configured to access the storage of the smart card or other portable storage device, and the storage will be formatted accordingly. Such formatting may be undertaken at a smart card programming apparatus prior to use of the smart card at a processing unit. Alternatively the first processing unit to have a particular smart card inserted therein may format the configuration information storage area before storing of any configuration information. Such formatting would create a storage area in which data may be stored. A file allocation table will be created within the storage area by the file system, which table is used to track the storage and retrieval of files in the storage in a conventional manner.

A processing unit may therefore read and write directly to the configuration information storage area as it would a standard removable storage medium such as a floppy disc using a standard storage driver interface.

Figure 10:
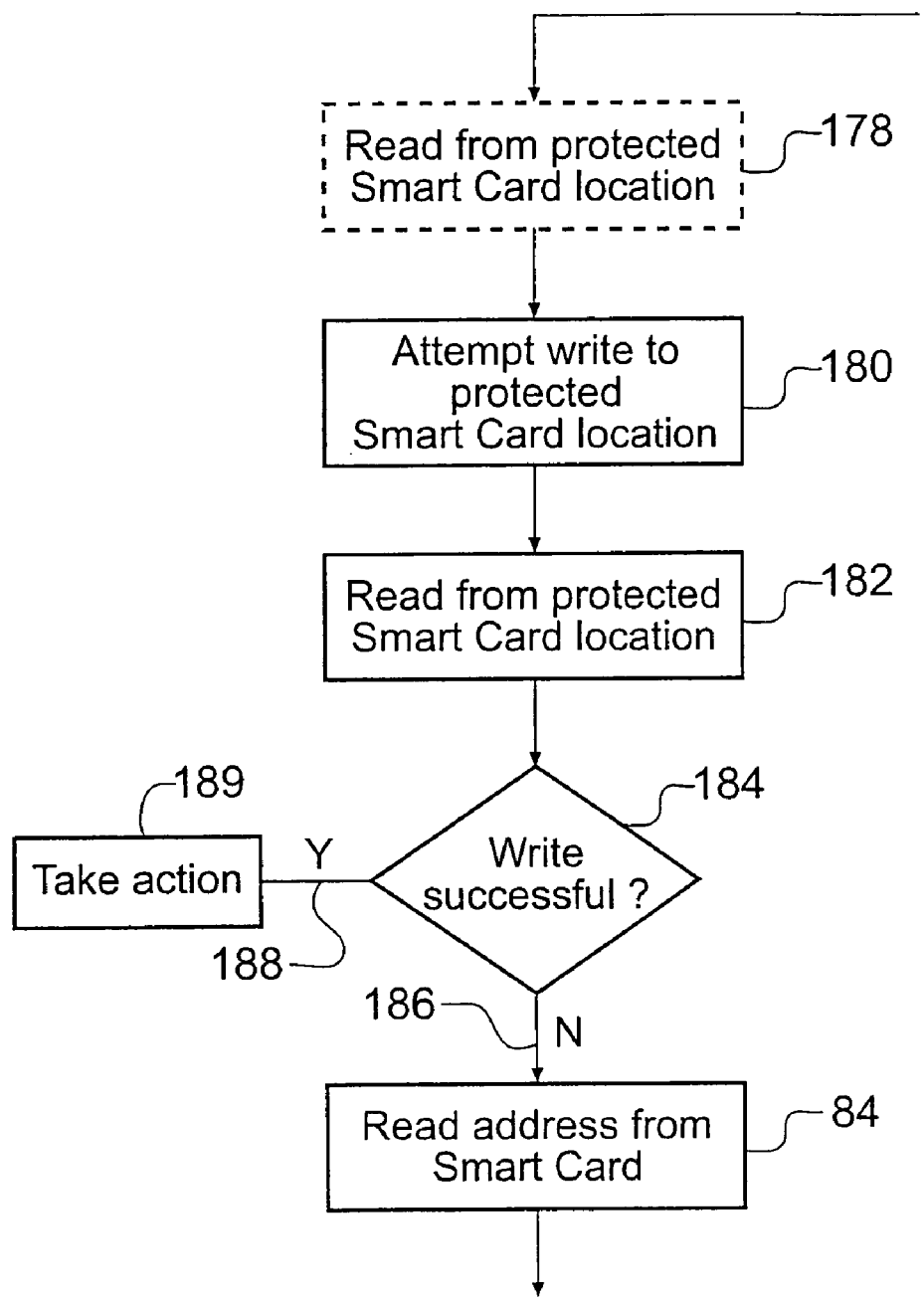
FIG. 10 is a flow diagram illustrating a modification to the processes of FIGS. 5 and 7.
Figure 11:
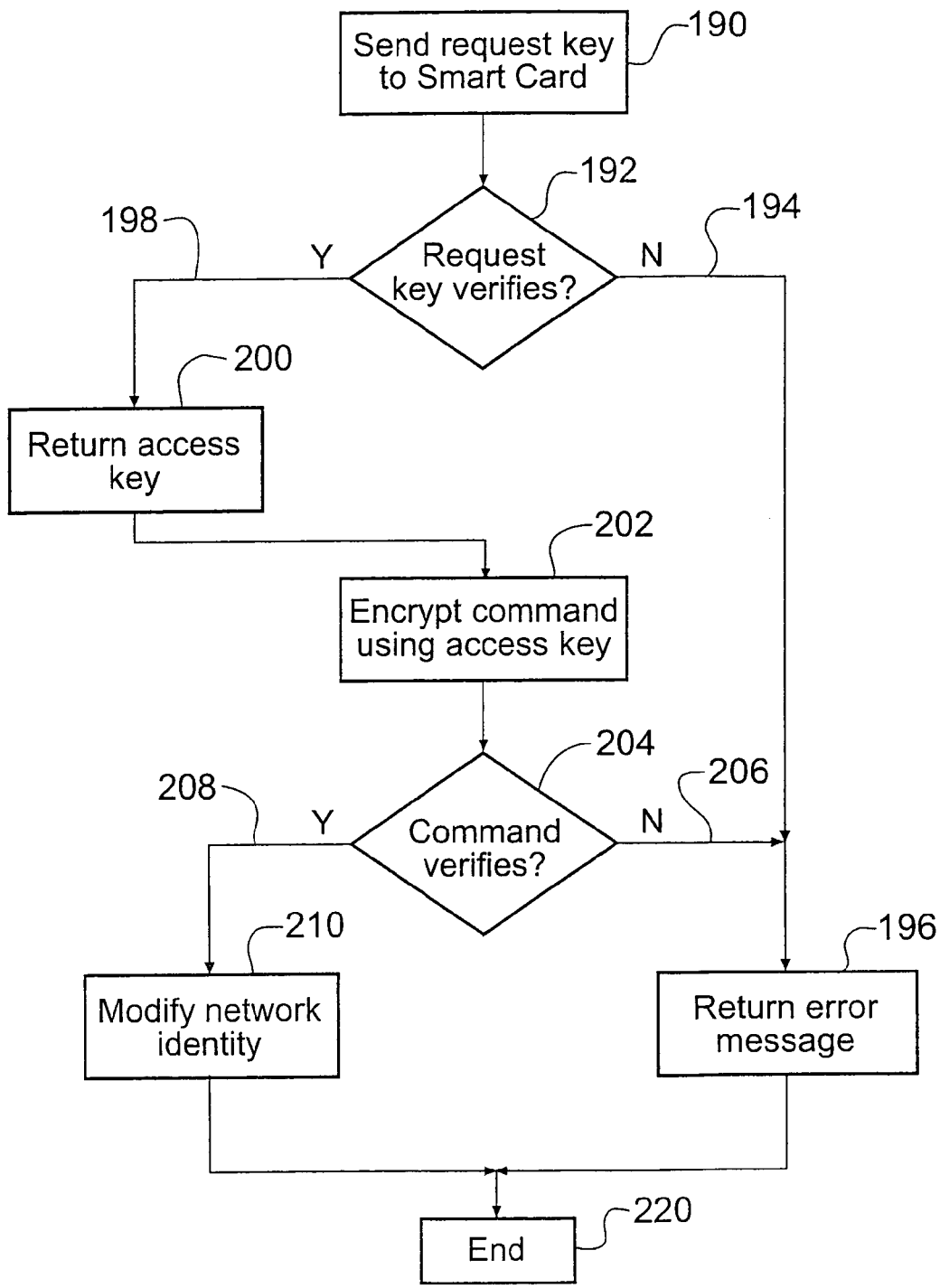
FIG. 11 is a flow diagram of a process for modifying a network identity held on the portable storage device.
Figure 12:
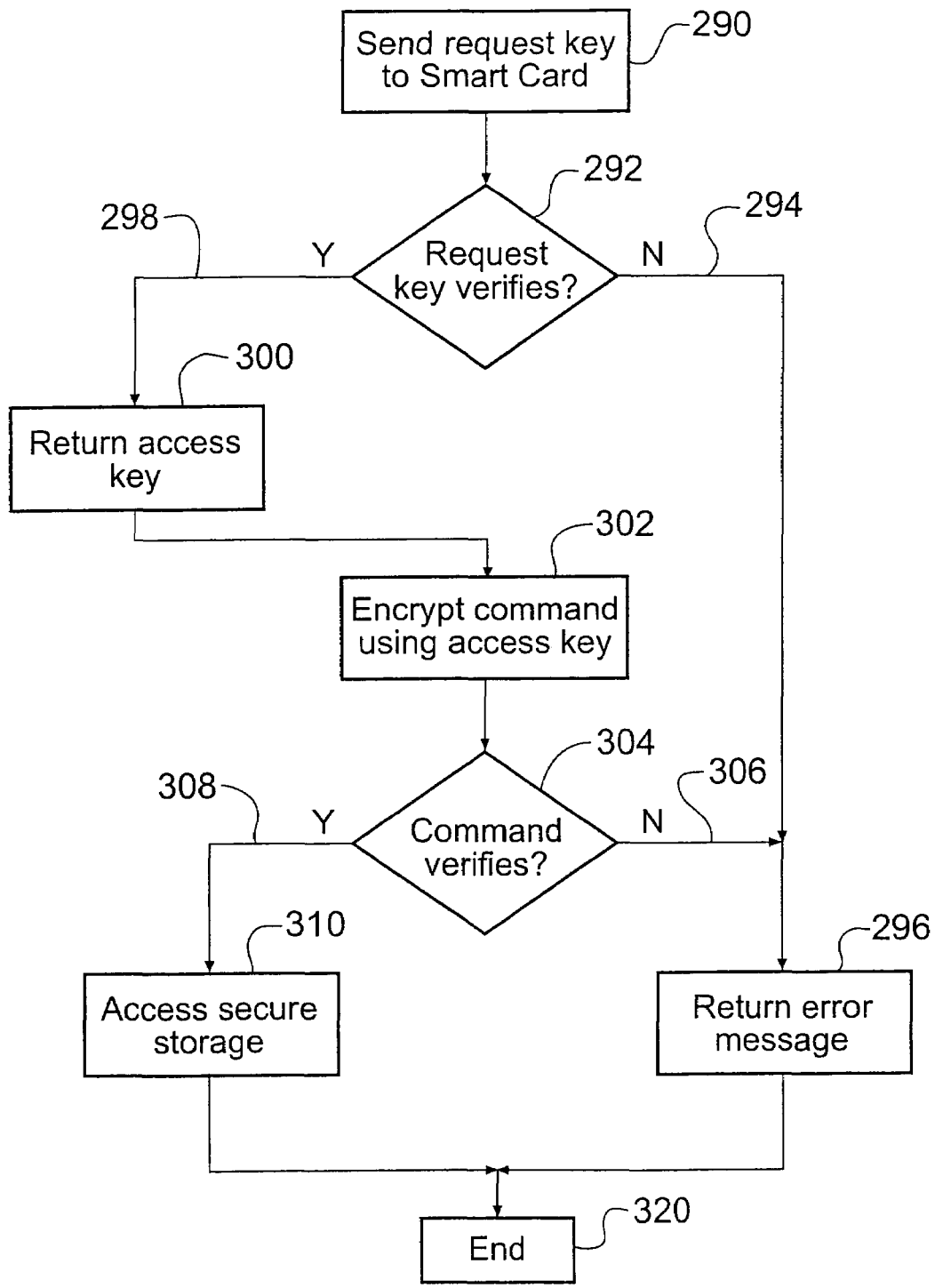
FIG. 12 is a flow diagram of a process for accessing secure information held on the portable storage device.

FIGS. 10–12 employ the security aspects of such commercially available smart cards to enhance the security and functionality of portable storage devices that contain the network identity for a processing unit.

Through the use of a smart card as illustrated schematically in FIG. 9, it is possible for the network identity held in the smart card to be placed in a secure storage portion of the storage 58. Thus, for example, the access controller 160 can be operable to implement key-key encryption in respect of the storage portion 168.

With this in mind, FIG. 10 describes additional steps that can be inserted in the processes of FIGS. 5 and 6 between the decision path 83 and the step 84 in which an address is read from the smart card. These additional steps enable the processing unit to verify that the smart card is an authentic smart card with a secure network identity and is not merely a copy of a smart card with the appropriate information stored at an appropriate place within the smart card. This is achieved by attempting to overwrite what should be a secure network identity, and then testing whether the attempt is successful.

Accordingly, following decision path 83 of FIGS. 5 and 6, and as shown in FIG. 10, an optional step 178 is to read the content of a predetermined memory location 166 in the smart card memory 58 that is normally unused and should be within a secure write-protected area of the smart card memory 58. Such a memory location could be from within the block of bytes 160 that are used to hold the network identity. In a particular example, the network identity is held in a 20-byte block (e.g., 160) that includes blank bytes at predetermined locations. For example, some of those bytes could be used in this process as the card memory location 166, or alternatively a memory location in any other part of the secure card storage.

The content of that location can then be stored in memory or in a register in the processing unit. This step can be omitted if there is a predetermined memory address in a secure write-protected portion of a valid smart card that has known information stored therein. The known or read information can be termed the expected information.

The processing unit is operable in step 180 to attempt a simple write operation to write predetermined information (e.g., the content of a processing unit memory location or of a processing unit register) to the card memory location 166. The predetermined information to be written should be different from the expected information. This predetermined information is termed the written information. If the smart card is a valid smart card with an appropriately configured access controller, the access controller 160 will detect and prevent this unsecured and unencrypted attempt to modify part of the network identity. If the card in the card reader is not a valid secure smart card, and is, for example, a simple memory card, then the write operation will typically be effective.

In step 182, a read operation is effected from that same memory location 166 by the processing unit and in step 184 a test is made as to whether the information read from the secure memory location in step 182 corresponds to the expected information, or whether it corresponds to the written information.

If, in step 184, it is determined that the information read from the secure memory location in step 182 corresponds to the expected information, then it is assumed that the write attempt was not successful, and then decision path 186 is followed. At this point, the processing unit is able to determine from the failure of its write attempt that the smart card is a secure smart card, and is then able in step 84 to proceed with the processes of FIG. 5 or 6, as appropriate, to read the network identity from the smart card.

Alternatively, if, in step 184, it is determined that the information read from the secure memory location in step 182 corresponds to the written information, then it is assumed that write attempt was successful, and then decision path 188 is followed. At this point it is then assumed that the portable data device was not a secure smart card of the type described, and accordingly decision path 188 is followed. As a result of following decision path 188 to step 189, the processing unit could be configured to power itself down, or alternatively to use the network address from NV RAM in accordance with steps 90 and 92 of FIGS. 5 and 6.

In a secure smart card as described above, it will be necessary at some point to write required information to the smart card, even to the secure portions thereof. There now follows a description with reference to FIGS. 11 and 12 of processes for accessing and/or modifying the contents of the smart card or other portable storage devices that are provided with an access controller that controls access to one or more secure memory portions within the card using key-key encryption. Although, in the described examples, key-key encryption techniques are employed, other encryption techniques can also be employed. The processes of FIGS. 11 and 12 can be performed at any time following the processes of FIGS. 5 and 6 when the processing unit is powered up.

FIG. 11 describes a process enabling modifications to a network identity in a secure smart card, using conventional key-key encryption techniques.

In step 190, when it is desired to update a network identity at the card memory location 164 or reprogram the secure smart card, the processing unit 22, or a private application operating on the processing unit 22 is operable as an originator to send a request encrypted with a supplied key to the smart card 54 via the card reader 40. The supplied key used to encrypt the request can be a key allocated to the processing unit or the private application, for example.

In decision step 192, the access controller 160 is operable to verify the supplied key against the originator's public serial number (key). If the supplied key supplied by the originator for the request does not verify against the public key, then the decision path 194 is followed and an error message is returned at step 196 to the processing unit and access to the network identity stored in the storage portion 168 is not permitted.

If, however, in decision step 192, it is determined that the supplied key for the request does verify against the public key, then decision path 198 is followed and the access controller 160 is operable in step 200 to generate and return an access key generated using a private serial number (key) held by the access controller 160 (e.g., in firmware or a register in access controller or in a secure portion of the smart card memory 58).

In step 202, the processing unit 22 is then operable to encrypt a command using the supplied access key for modifying the network identity stored in the secure storage portion 168 of the storage of the smart card 54. This encrypted command is then sent via the card reader 40 to the smart card 54.

In decision step 204, the access controller 160 is then operable to verify the received encrypted command.

If the encrypted command does not verify correctly, then decision path 206 is followed and an error message is returned at 196 to the processing unit 22.

Where, however, the received encrypted command does verify correctly, then decision path 208 is followed, and in step 210 the network identity at the card memory location 164 is modified. The process ends at step 220.

It can be seen that the process of FIG. 11 can enable the programming of an appropriate network identity, or processing unit ID, and to replace damaged cards using conventional key-key encryption. The key-key (paired key) encryption interface is provided within the access controller (microprocessor or microcontroller) in conventional and commercially available secure smart cards. An operator can use a private application to send a key that is verified against its public serial number (key) by the code in the access controller 160. The access controller 160 then replies with another key generated using the private serial number (key) held in the access controller code. The private application can then send an encrypted command to reprogram the network identity in the memory of the smart card 54.

As this process employs key-key encryption, this process could also be performed by a remote service engineer on a live spare card at a customer site to give an instant replacement without concerns over the security of the cards being compromised.

It will be appreciated that this approach is not restricted to use with network identities for processing units such as server systems, but could be extended to all computer systems provided with card readers to provide for a secure identity for software licensing that can rapidly be moved to a new system in the event of a failure. For PC-based systems, the appropriate network identity will be a system primary MAC address. The use of an approach as described with reference to FIG. 10 can avoid the use of third parties having to provide "dongle" protection to software as a secure smart card provides a secure medium for identification purposes.

For example, typical hardware and software network access encryption solutions require long-term network security encryption keys (network security encryption keys) that are associated with session creation. The network security encryption keys are used to encrypt messages, files and transmissions, for example for access to and for providing services, etc. They are digitally signed by a certificating authority and have a life of approximately 2 years. If a server containing the hardware or software encryption solution fails, the rapid transfer of these keys to a replacement server in a secure fashion is highly desirable to increase service availability.

FIG. 12 illustrates an approach to this that is comparable to the approach described earlier with reference to FIG. 11 for managing secure network identities. In particular, a secure removable and portable storage device, such as a secure smart card, as used for holding the network identity, can also be used for storing network security encryption keys. In this way, the network security encryption keys can be associated with a processing unit when the secure portable storage device is present in the processing unit, but can rapidly be moved to a replacement processing unit without a service engineer having access to the network security encryption keys.

Through the use of a secure portable storage device such as a secure smart card, the network identity and the network security encryption keys can be protected by means of key-key encryption and can therefore be secure with regard to unauthorised access to that information.

The long-term network security encryption keys can be stored in a secure storage portion (e.g., the portion 170 or the portion 172) of the storage 58 of the smart card 54. If the encryption chip hardware interface of the smart card is then exported to allow a key-key encrypted link to be set up for reading and writing the keys, the processing unit 22 can be operable to negotiate reading of the keys, and writing of the keys to the secure smart card. In this way, the initial programming of the smart card is possible, and then this programming can be transferred to a further processing unit 22' without the other processing unit 22 ever knowing the keys. As such, following initial programming, the keys are only ever actually known internally to the access controller 160 of the smart card and are therefore highly secure.

A software approach to programming and accessing the smart card can be achieved by initiating a key-key encrypted session to the smart card and either reading or writing keys to the card for initial storing and/or retrieving of the keys in the event of the processing unit 22 being exchanged. Details of such a process is described below with reference to FIG. 12, which corresponds generally to the process of FIG. 11.

FIG. 12 describes a process enabling long-term network security encryption keys to be held in secure storage in a secure smart card, using conventional key-key encryption techniques.

In step 290, when it is desired to access a long-term network security encryption key held, for example, in a secure portion 170 of the secure smart card 54, the processing unit 22, or a private application operating on the processing unit 22, is operable as an originator to send a request encrypted with a supplied key to the smart card 54 via the card reader 40. The supplied key used to encrypt the request can be a key allocated to the processing unit or the private application, for example.

In decision step 292, the access controller 160 is operable to verify the supplied key against the originator's public serial number (key). If the supplied key supplied by the originator for the request does not verify against the public key, then the decision path 294 is followed and an error message is returned at step 296 to the processing unit and access to the secure portion 170 is not permitted.

If, however, in decision step 292, it is determined that the supplied key for the request does verify against the public key, then decision path 298 is followed and the access controller 160 is operable in step 300 to generate and return an access key generated using a private serial number (key) held by the access controller 160 (e.g., in firmware or a register in access controller or in a secure portion of the smart card memory 58).

In step 302, the processing unit 22 is then operable to encrypt a command using the supplied access key for accessing the secure storage portion 170 of the storage of the smart card 54. This encrypted command is then sent via the card reader 40 to the smart card 54.

In decision step 304, the access controller 160 is then operable to verify the received encrypted command.

If the encrypted command does not verify correctly, then decision path 306 is followed and an error message is returned at 296 to the processing unit 22.

Where, however, the received encrypted command does verify correctly, then decision path 308 is followed, and in step 310 the secure storage portion 170 is accessed. The process ends at step 320.

The access that is performed could be either a read or a write access. Each type of access could be controlled separately, or access could be permitted for both reading and writing.

It can be seen that the process of FIG. 12 can enable the initial programming of a secure smart card with long term encryption keys and modifications to those keys, as required, subject to being able to provide an appropriate key to the smart card to be able to get access to the appropriate storage portion in the smart card using conventional key-key encryption. The key-key encryption interface is provided within the access controller (microprocessor or microcontroller) in conventional and commercially available secure smart cards. As described with reference to FIG. 11, an operator can use a private application to send a request using a key for that application, which is verified against its public serial number (key) by the code in the access controller 160. The access controller 160 then replies using another key generated using the private serial number (key) held in the access controller code. The private application can then send an encrypted command to access the encryption keys in the secure portion 170 in the memory of the smart card 54.

To facilitate access to the storage portions such as the storage portions 168, 170 and 172 of the smart card storage, the processing unit can be operable to access the storage in a format such as a file, whereby the processor can reference the content of the storage in the same manner as a file held on a disk, or the like.

As noted above, it may be appropriate for the configuration information also to be stored in a secure area of the memory of the smart card. In this case, the configuration information may be stored within the same secure area of memory as the network identity, in which case the authentication and access procedures described above with reference to FIGS. 10 to 12 also provide access to the configuration information. Alternatively, the configuration information may be stored in a secure area of memory separate to the secure area of memory used for the network identity. In this case, separate authentication and access processes equivalent to those described above with reference to FIGS. 10 to 12 must be executed in order to access the configuration information.

It will also be appreciated that the process described with reference to FIGS. 11 and 12 could also be applied to the storage of different types of information held in files.

Figure 13:
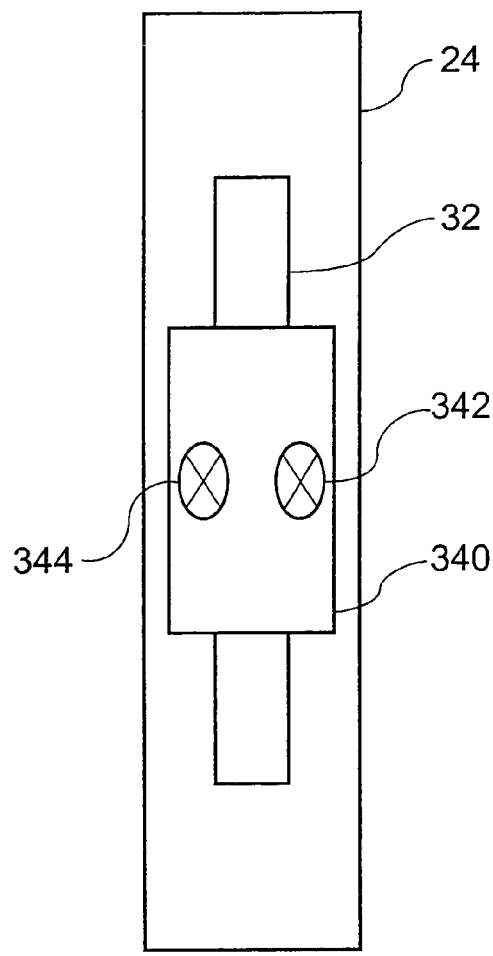
FIG. 13 is a schematic diagram illustrating a security fixing on a receiving slot of a device reader.

As mentioned earlier, to prevent inadvertent removal of the smart card 54 from the card reader 40, means can be provided to resist removal of the smart card. FIG. 13 illustrates an example of this where parts also appearing in FIG. 4 bear the same numerical references. In FIG. 8 the front of the motherboard 24 in which the receiving slot 32 formed is shown to include a security barrier 340 which covers the front of the receiving slot 32 of the motherboard 24 so as to obstruct the receiving slot 32. The barrier 340 is secured in place by fixing screws 342, 344 which may be shaped and configured to prevent removal of the fixing screws 342, 344 without provision of a correspondingly configured removing tool. The arrangement of the barrier 340 and the fixing screws 342, 344 is provided to prevent the smart card 54 from being removed from the smart card reader 40. Alternatively, for the embodiment shown in FIG. 6 the barrier 340 and fixing screws 344, 342 are arranged to prevent an incorrect smart card being introduced into the smart card reader 40 after the motherboard has already been configured with the correct network identity, which has been loaded into the address register 85, and configuration information. It will be appreciated that fixing techniques other than screws can be used.

Figure 14:
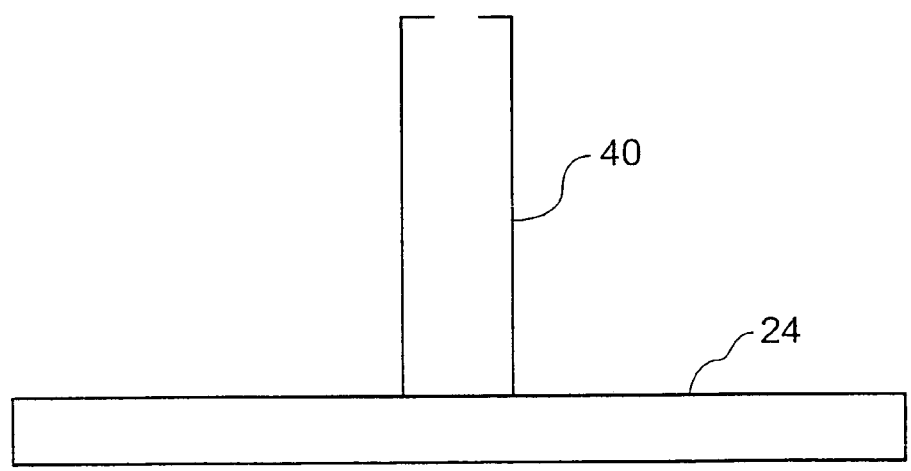
FIG. 14 is a schematic diagram illustrating an alternative arrangement of a device reader.

Although the smart card reader 40 shown in FIG. 4 is mounted with the plane of the smart card substantially parallel to the plane of the motherboard, alternative arrangements are possible and will be determined by the mechanical requirements for mounting the smart card reader on the motherboard. As such an alternative arrangement is shown in FIG. 14 in which the smart card reader 40 is mounted perpendicularly to the plane of the motherboard 24.

Figure 15:
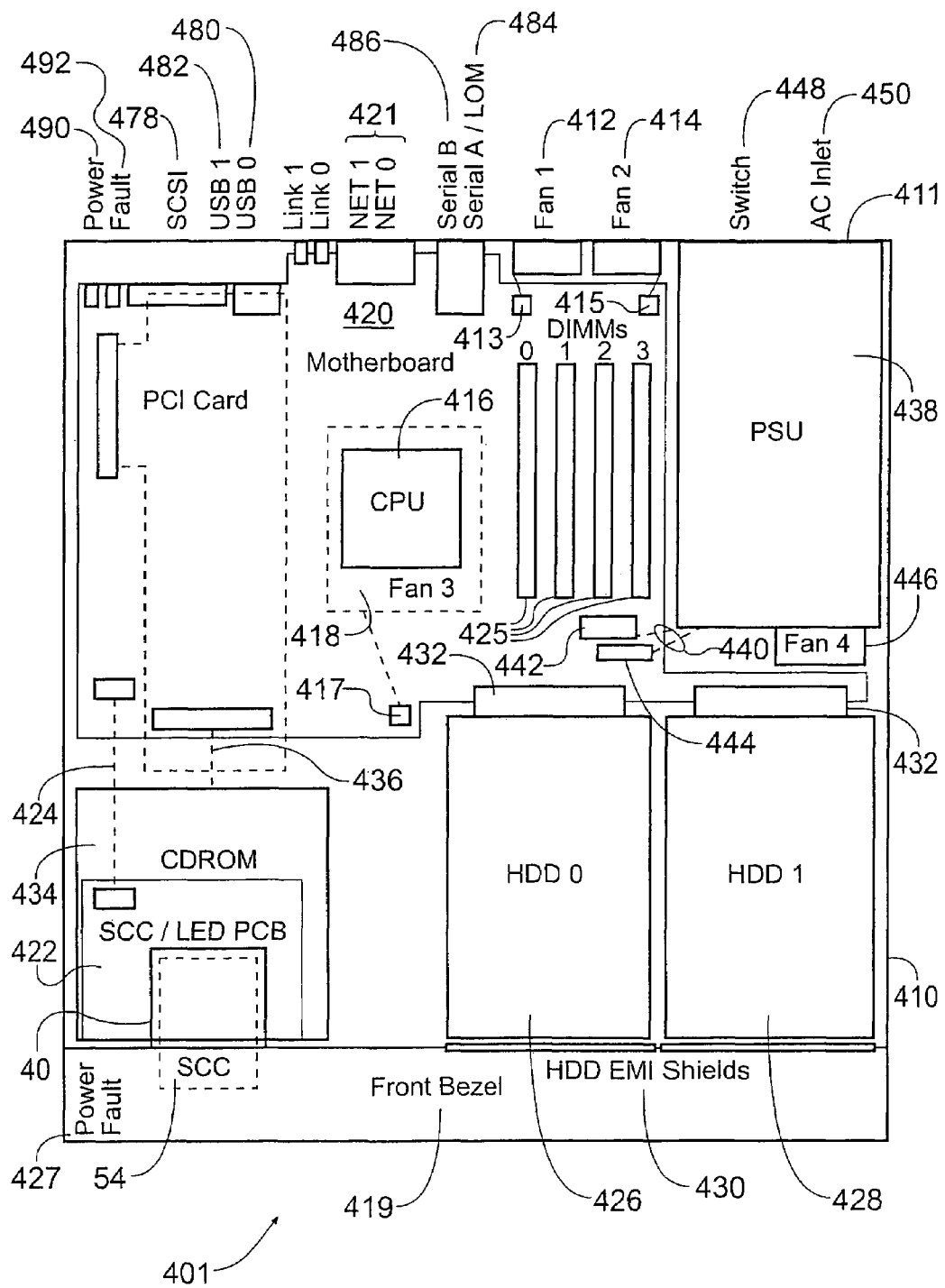
FIG. 15 is a schematic representation of an example of a processing unit incorporating the invention.

FIG. 15 illustrates a further example of a processing unit according to the invention. FIG. 15 is a physical plan view of a narrow form factor computer system 401 designed for rack mounting that implements an embodiment of the invention. This example of a processing unit provides a compactly configured computer server offering high performance at reasonable cost.

The computer system 401 comprises an enclosure 410 with a front bezel 419 that is removable for front access to the disk drives and a portable storage device 54 and device reader 40.

The portable storage device 54, which can be implemented as smart card, is known as a System Configuration Card (SCC) in the context of this example.

Rack mounting is supplied for standard 19" racks via right-angled flanges (not shown). Slide-rail support is also provided.

The enclosure 410 is cooled, from front to rear, by two system fans 412, 414 mounted on a rear panel of the enclosure, with venting in the front and rear panels as required. The host processor (CPU) 416 also has its own dedicated local cooling comprising an impingement fan 418 that clips onto the CPU socket. These three fans plug directly into the motherboard 420 at 413, 415 and 417, respectively. The motherboard 420 is a PCB assembly, designed in a custom form-factor to fit the enclosure 410. The shape of the motherboard is chosen so as to minimise cabling within the enclosure. The motherboard 420 carries the majority of circuitry within the computer system 401.

All external interfaces are included directly on the rear edge of the motherboard, for access through the rear-panel 411 of the enclosure 410. The external interfaces comprise two network interfaces 421, two serial interfaces 484, 486 and a Small Computer System Interface (SCSI) interface 478. Indicators (e.g., LEDs) for Power, Fault and Network Link status are also positioned at the rear of the enclosure. These can include a power LED 490 that is illuminated when the processing unit is powered and a fault LED 491 that can be operated (e.g., illuminated or flashed) to indicate a fault condition.

A system, or host, processor (CPU) 416 for the computer system 401 is mounted in a standard zero insertion force (ZIF) socket on the motherboard 420. It has a passive heat sink. Dual in-line memory modules (DIMMs) are mounted in sockets 425 on the motherboard 420. A small printed circuit board (PCB) 422 is included at the front of the enclosure 410 to carry a System Configuration Card (SCC) reader 40 and LEDs 427 for Power and Fault status indication. A 10-way ribbon cable 424 connects this PCB to the motherboard 420. Two SCSI hard disk drives 426 and 428 are mountable in respective bays to the front of the motherboard 420. The drives are hot-pluggable and are accessible by removal of the front bezel 419 and EMI shields 430. The two internal SCSI hard disk drives 426 and 428 plug directly into the motherboard via right-angled connectors 432 located on the front edge of the motherboard 420.

A slim (notebook-style) CDROM drive bay is provided, mounted laterally in front of the motherboard, for a CDROM drive 434. Compact disks may be inserted and removed via an access slot (not shown) located on the lower left side of the front bezel 419. A connector at the rear of the CDROM bay connects the CDROM drive 434 via a ribbon cable 436 to the motherboard 420.

A Power Supply Unit (PSU) 438 is connected to the motherboard via a short harness 40 with two mating connectors 442 and 444 for power and services. The PSU 438 has its own cooling fan 446 and additionally houses the system power switch 448 and power input connector(s) 450.

Figure 16:
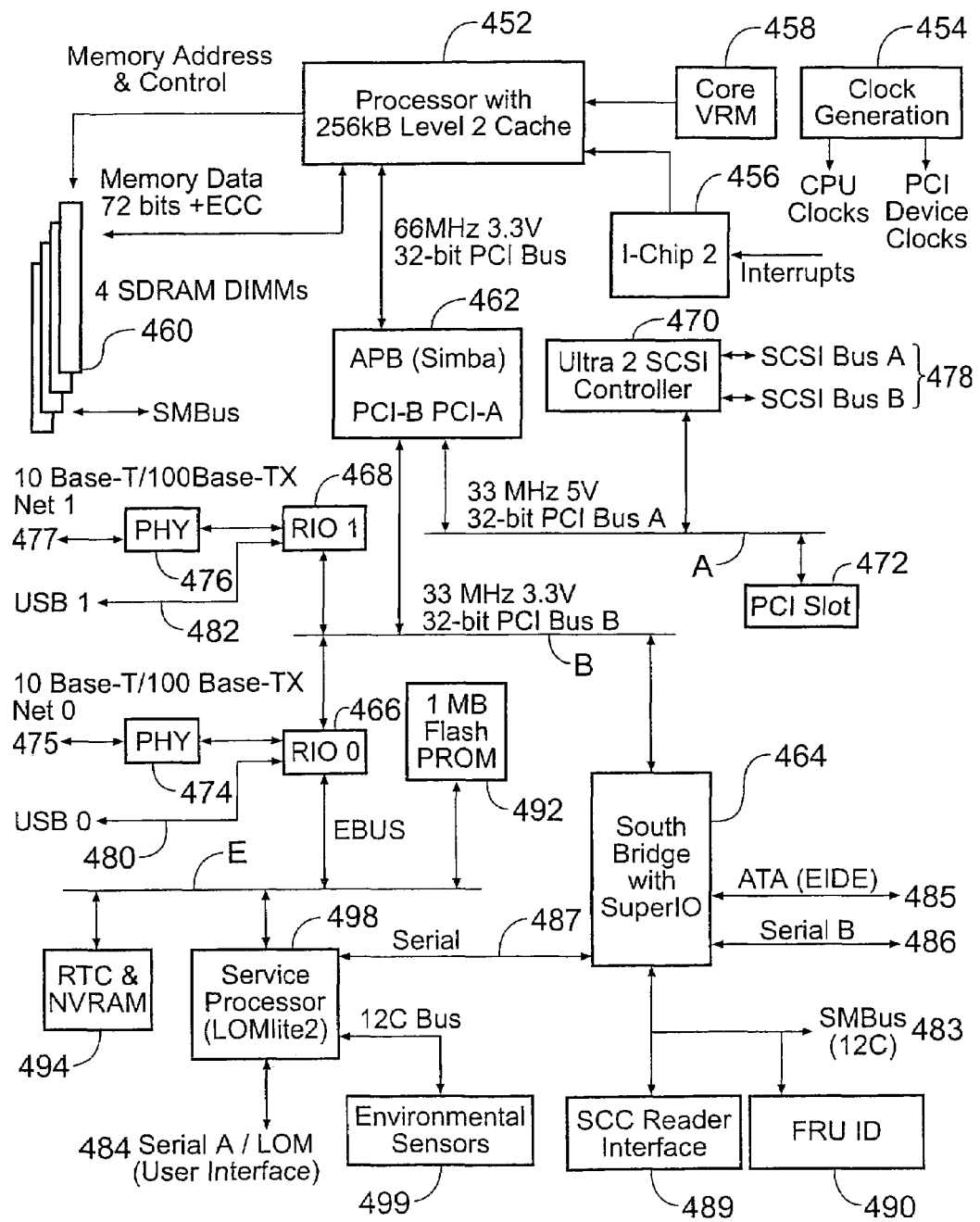
FIG. 16 is a block diagram representing functional elements of the processing unit of FIG. 15.

FIG. 16 is a schematic block diagrammatic representation of the system architecture for the processing unit of FIG. 15.

In this particular example, the CPU 416 of FIG. 16 is an UltraSparc™ processor 452 available from Sun Microsystems, Inc. In other embodiments other processors could, of course, be used. A configurable clock generator 454 is provided to supply various system clocks. A vectored interrupt controller (I-Chip2) 456 is provided for handling interrupts. Also provided is a configurable core Voltage Regulator Module (VRM) 458.

Four sockets 425 are provided for commodity DIMMs 460. Connections are provided for a 72 bit data path with Error Correction Codes (ECC). A Personal Computer Interconnect (PCI) bus architecture is provided that includes an Advance PCI Bridge (APB) 462. This PCI Bridge 462 concentrates two secondary PCI busses (PCI Bus A and PCI Bus B) onto a primary PCI bus (PCI Bus) as represented in FIG. 16.

A so-called South Bridge 464 is a commodity PCI 10 device used extensively in the PC industry. Among other functions, it implements a dual IDE controller, a System Management Bus (SMBus) controller, two Asynchronous Serial Interfaces and a power management controller. The IDE controller component of the South Bridge 464 supports a maximum of four IDE devices via Primary and Secondary ATA busses 485. The (SMBus) host controller provides an I2C compatible, synchronous serial channel 483 for communication with devices sharing the SMBus protocol. The SMBus is used to communicate with the DIMMs. It is also used to communicate with the System Configuration Card (SCC) reader interface 489 (for the portable storage device reader 40), with a chip 490 holding information for identifying a field replaceable unit (FRU ID) to obtain configuration information and with the DIMMs 460.

The two Asynchronous Serial Interfaces provide two serial channels (Serial B and Serial) 486 and 487. The Serial B channel 486 connects directly to provide an external port via an RJ45 connector.

The Serial channel 487 is selectively connectable to an external user interface port (Serial A/LOM) 484 having an RJ45 connector via the service processor 498. The service processor 498 selectively connects the external port 484 to, and disconnects the external port 484 from, the serial channel 487 to enable the external port 484 to be used as a combined Console/LOM port. Serial Universal Asynchronous Receiver/Transmitters (UARTs) are located within the South Bridge 464 for controlling the serial communication.

Two Personal Computer IO (PCIO) devices (RIO 0 and RIO 1) 466 and 468 are also provided. These PCIO devices 466 and 468 are positioned on PCI Bus B. The first PCIO device 466 provides EBUS, Ethernet and Universal Serial Bus (USB) interfaces. EBUS is a Sun Microsystems parallel bus compatible with the so-called Industry Standard Architecture (ISA) bus protocol. The second PCIO device 468 implements Ethernet and USB interfaces.

A dual wide (16 bit) Fast-40 (Ultra2SCSI) controller 470 connects two independent SCSI busses (SCSI Bus A and SCSI Bus B) 478 to the PCI Bus A.

FIG. 16 also illustrates a 1 MB Flash PROM 492 for configuration and boot information, and a Real-time Clock (RTC) with 8 kB Non-Volatile Random Access Memory (NV RAM) 494.

As shown in FIG. 16, a service processor 498 is also provided. In the present embodiment, the service processor 498 is implemented as an embedded microcontroller module based on the Hitachi H8 series of Flash microcontrollers. The module can be directly incorporated onto a motherboard at very low cost.

In an embodiment of the invention, the microcontroller 498 can be programmed with microcode to control the reading of the portable storage device 54 via the South-Bridge 464 and the SCC reader interface to the device reader 40 and the processes described with reference to FIGS. 5, 7, 9 and 10–12.

Figure 17:
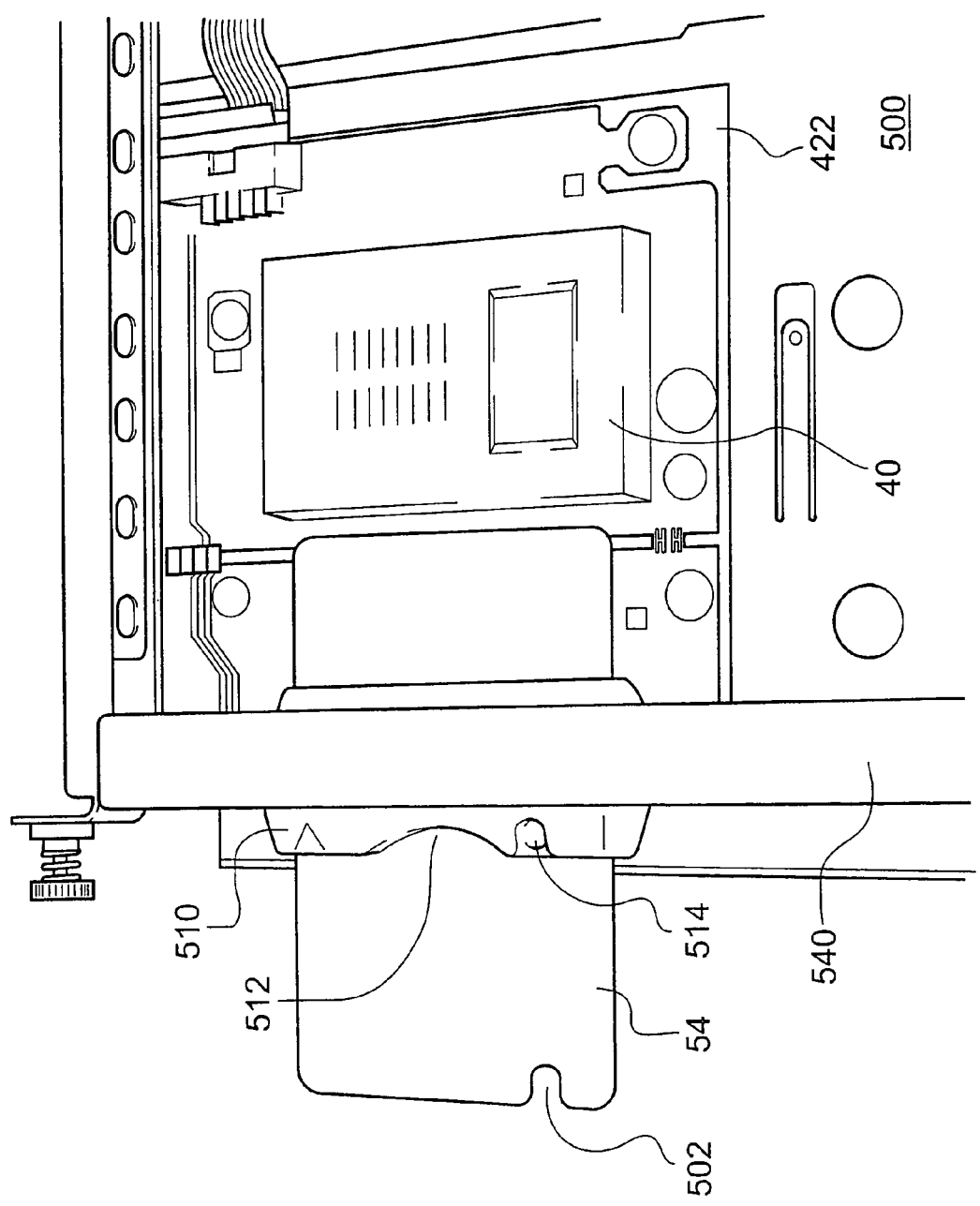
FIGS. 17 and 18 illustrate the insertion of a portable storage device into a device reader in the processing unit of FIG. 15.

FIG. 17 shows a system configuration card 54 being inserted into the device reader 40 that comprises a card receiver 510 and a card reader 40 mounted on the PCB 422 mentioned with reference to FIG. 15.

The system configuration card 54 is shown with the printed circuit on the underside for being read by the card reader 40. The card receiver 510 provides a slot for receiving the system configuration card 54 and for guiding the system configuration card into the card reader 40. The card receiver 510 is provided with a hole 514 through which a locking device can be inserted for securing the card in the inserted position. As shown in FIG. 17, with the card 54 partially inserted, the hole 514 is blocked by the card 54.

Figure 18:
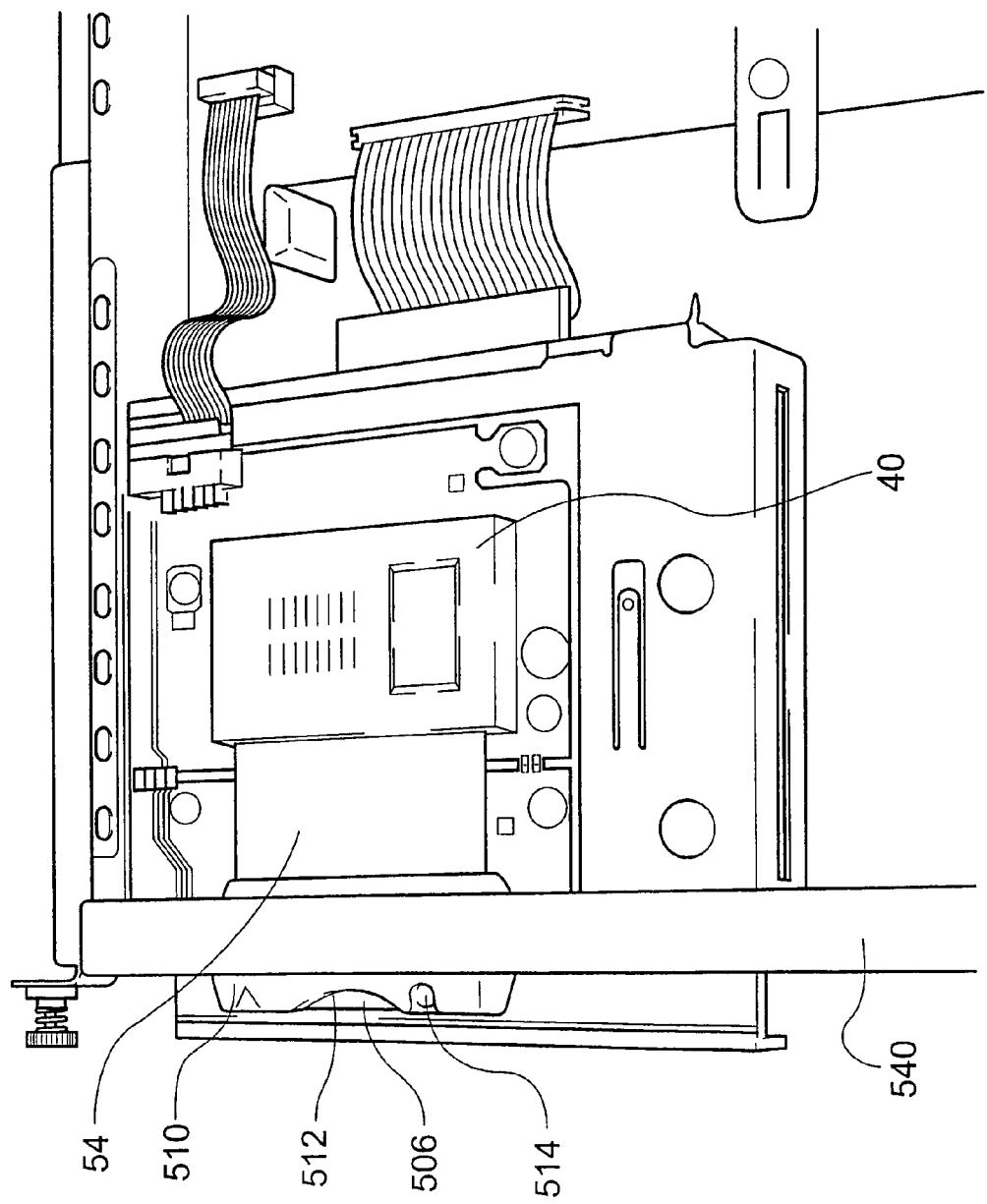

However, when the card 54 is fully inserted, as shown in FIG. 18, at which time the circuit contacts in the card are in contact with card reader contacts (not shown) provided within the card reader 40, the hole 514 in the card receiver 510 aligns with the notch 502 in the card 54. In this position, a locking device, for example a padlock, a wire with a seal, a cable tie, or the like, may be inserted through the hole 514 to lock the card in place. In the fully inserted position as shown in FIG. 18, it will be noted that a small portion 506 of the card 54 is still visible in a recess 512 in the card receiver 510, whereby the end of the card can be gripped to pull the card out of the card reader 40 assuming that a restraint or locking device is not provided through the hole 514 at that time.

A computer program product including a computer program for implementing one or more of the processes described with reference to FIGS. 5, 6, 7, 8, 10, 11 and 12 can be provided on a carrier medium. The carrier medium could be a storage medium, such as solid state magnetic optical, magneto-optical or other storage medium. The carrier medium could be a transmission medium such as broadcast, telephonic, computer network, wired, wireless, electrical, electromagnetic, optical or indeed any other transmission medium or signal.

There has been described, a portable storage device, for example a secure smart card, contains network identification information for a processing unit that is connectable to a data communications network and configuration information to configure the software and/or hardware components of a processing unit to a required first state, which processing unit includes a device reader for reading the portable storage device. The portable storage device includes storage and an access controller. The storage holds a network identity for the processing unit, at least one encryption key and software configuration information. The access controller is operable to control access to the storage by implementing key-key encryption. An embodiment of the invention thus provides a medium not only for storing a network identity for processing unit and startup configuration information, but also for other secure information such as an encryption key associated therewith.

The processing unit can be operable to access a secure portion of the storage of the portable storage device by supplying a request key to the access controller of the portable storage device, and, in response to receipt of an access key from the access controller, to send an encrypted command to access the content of the storage of the portable storage device. In response to the return of an access key, the processing unit can be operable to use the access key to encrypt a command for access to a secure storage in the portable storage device.

The access controller can be operable to perform key-key verification of a request key supplied from the processing unit and, in response to the request key verifying correctly, to return to the processing unit an access key derived from the first encryption key to permit access to the secure storage portion. In this manner, controlled access by a processing unit to the secure storage portion can be achieved. The access controller can then be subsequently operable to respond to a command from the processing unit that is encrypted using the access key to access the secure storage portion. The encryption keys are held in the secure storage portion, for example, in a file in the secure storage portion. One data can be stored in respective secure storage portions, access to each secure storage portion being controlled by an encryption key.

As will be appreciated by those skilled in the art, various modifications may be made to the embodiments herein before described without departing from the spirit and scope of the present invention.

In particular, although the embodiment of the present invention has been described for an application in which the processing unit is replaceably mounted in a chassis, it will be appreciated that in other embodiments, the processing unit may be any device that is connectable to a communications network. It will be appreciated that in other embodiments the network identity is provided to such devices through a smart card and a smart card reader. As will be appreciated, also, a smart card is one example of a secure portable storage device and that secure portable storage devices having other formats could be used with an appropriate device reader being provided.

Although in the above description, reference is made to the configuring of software and/or hardware, the configuration information stored on the portable storage device could equally include configuration information to control configuration of firmware in the processing unit.

Also, programming may be provided within the access controller 59 to allow the access controller to act as an interface between the processing unit and the smart card memory for controlling the formatting of that storage. For example, with such an arrangement, the processing unit can access the smart card as though it is addressing a standard memory area using a known filesystem format, whereas in fact the data is stored in memory in a manner known to the access controller, which access controller interprets between the smart card storage format and the processing unit.

What is claimed is:

1. A portable storage device comprising:
   storage, wherein the storage is configured to store a network identity for a processing unit and configuration information for the processing unit; and
   an access controller;
   wherein the processing unit comprises a device reader configured to read the network identity and the configuration information from the storage, and wherein the processing unit is identifiable on a data communications network using the network identity.

2. The portable storage device of claim 1, wherein the configuration information comprises software configuration information.

3. The portable storage device of claim 1, wherein the storage is configured to include at least one file.

4. The portable storage device of claim 3, wherein said configuration information is stored in said at least one file.

5. The portable storage device of claim 1, wherein the storage comprises at least one secure storage portion accessible only under the control of the access controller.

6. The portable storage device of claim 5 wherein the storage holds at least one encryption key.

7. The portable storage device of claim 6 wherein said at least one encryption key is held in said secure storage portion.

8. The portable storage device of claim 6, wherein the access controller is operable to perform key-key verification of a request encrypted by a request key supplied from the processing unit and, in response to the request key verifying correctly, to return to the processing unit an access key derived from said at least one encryption key to permit access to the secure storage portion.

9. The portable storage device of claim 8, wherein the access controller is subsequently operable to respond to a command from the processing unit that is encrypted using the access key to access the secure storage portion.

10. The portable storage device of claim 5, wherein at least one network security encryption key is held in said secure storage portion.

11. The portable storage device of claim 5, wherein at least one file is configured in said secure storage portion.

12. The portable storage device of claim 1, wherein the storage in the portable storage device comprises random access memory.

13. The portable storage device of claim 1, wherein the access controller is a programmed microcontroller.

14. The portable storage device of claim 1, wherein the portable storage device is a smart card.

15. The portable storage device of claim 1, wherein the network identity comprises a MAC address.

16. The portable storage device of claim 1, wherein the configuration information comprises information describing a desired initial state of executable programming to be implemented by the processing unit.

17. A processing unit connectable to a data communications network, the processing unit comprising:
   a device reader configured to read a portable storage device that includes storage and an access controller, the storage storing a network identity for the processing unit and configuration information for the processing unit;
   wherein the processing unit is configured to read the stored network identity and configuration information from the storage on initialization of the processing unit.

18. The processing unit of claim 17, wherein the processing unit is further operable to write configuration information to the storage of the portable storage device.

19. The processing unit of claim 18, wherein the processing unit is operable to access the configuration information in the storage of the portable device using a file system.

20. The processing unit claim 17, wherein the storage holds at least one encryption key, the processing unit being operable to access a secure portion of the storage by supplying a key-encrypted request to the access controller, and, in response to receipt of an access key from the access controller, being operable to send an encrypted command to access the content of the storage of the portable storage device.

21. The processing unit of claim 20, wherein, in response to the return of the access key, the processing unit is operable to use the access key to encrypt a command for access to a secure storage in the portable storage device.

22. The processing unit of claim 17, wherein the portable storage device is a smart card, the access controller is a microcontroller and the device reader is a smart card reader.

23. The processing unit of claim 17, wherein the network identity comprises a MAC address.

24. The processing unit of claim 17, wherein the configuration information comprises information describing a desired initial state of executable programming to be implemented by the processing unit.

25. The processing unit of claim 17, comprising a service processor, the service processor being programmed to control reading of the portable storage device.

26. The processing unit of claim 25, wherein the service processor is a microcontroller.

27. The processing unit of claim 17, wherein the processing unit is a computer server.

28. The processing unit of claim 17, wherein the processing unit is a rack mountable computer server.

29. The processing unit of claim 17, wherein the processing unit is further operable to dynamically modify the configuration information stored in the storage of the portable storage device during use in response to changes in a configuration of the processing unit.

30. The processing unit of claim 29, wherein the processing unit is further operable to dynamically modify the configuration information describing current operational conditions of software being run by the processing unit and current operational conditions of hardware components of the processing unit.

31. A control program carried by a storage medium, wherein the control program is executable by a processing unit to perform the steps comprising:
read a stored network identity and configuration information from a portable storage device on initialization of the processing unit, wherein the network identity is usable to identify the processing unit on a data communications network; and
dynamically modify the stored configuration information during use of the processing unit in response to changes in a configuration of the processing unit.

32. The control program of claim 31, wherein said dynamically modifying the stored configuration information during use in response to changes in a configuration of the processing unit includes the control program modifying the stored configuration information describing current operational conditions of software being run by the processing unit and current operational conditions of hardware components of the processing unit.

33. The control program of claim 31, wherein the control program is operable to access the configuration information in the storage of the portable device using a file system.

34. The control program of claim 31, wherein the control program is operable to access a secure portion of the storage of the portable storage device by supplying a key-encrypted request to the access controller, and, in response to receipt of an access key from the access controller, being operable to send an encrypted command to access the content of the storage of the portable storage device.

35. The control program of claim 34, wherein, in response to the return of the access key, the control program is operable to use the access key to encrypt a command for access to secure storage in the portable storage device.

36. The control program of claim 31, wherein the portable storage device is a smart card, the access controller is a microcontroller and the device reader is a smart card reader.

37. The control program of claim 31, wherein the network identity comprises a MAC address.

38. The control program of claim 31, wherein the configuration information comprises information describing a desired initial state of executable programming to be implemented by the processing unit.

39. The control program of claim 31, comprising a service processor, the service processor being programmed to control reading of the portable storage device.

40. The control program of claim 31, wherein the processing unit comprises a service processor, the control program controlling operation of the service processor.

41. The control program of claim 31, wherein the service processor is a microcontroller.

42. A microcontroller comprising a control program for a processing unit, wherein the control program is executable to access a stored network identity and configuration information from a portable storage device on initialization of the processing unit, wherein the network identity is usable to identify the processing unit on a data communications network.

43. A computer server comprising:
a device reader configured to read a portable storage device receivable therein; and
a microcontroller, wherein the microcontroller is configured to read contents of storage in a portable storage device mounted in the device reader, and wherein the microcontroller comprises a control program executable to read a stored network identity for the computer server and configuration information for the computer server from the storage of the portable storage device on initialization of the computer server, wherein the network identity is usable to identify the computer server on a data communications network.

* * * * *